United States Patent
Kim

(10) Patent No.: US 9,890,344 B2
(45) Date of Patent: Feb. 13, 2018

(54) APPARATUS FOR DUST REDUCTION AND DISPERSION SUPPLY OF INPUT COAL IN SYSTEM FOR DRYING COAL USING REHEAT STEAM

(71) Applicant: HANKOOK TECHNOLOGY INC., Seoul (KR)

(72) Inventor: Sung Kon Kim, Anyang-si (KR)

(73) Assignee: HANKOOK TECHNOLOGY INC., Seoul (KR)

( * ) Notice: Subject to any disclaimer, the term of this patent is extended or adjusted under 35 U.S.C. 154(b) by 0 days.

(21) Appl. No.: 15/320,021

(22) PCT Filed: Jun. 17, 2015

(86) PCT No.: PCT/KR2015/006152
§ 371 (c)(1),
(2) Date: Dec. 19, 2016

(87) PCT Pub. No.: WO2015/194863
PCT Pub. Date: Dec. 23, 2015

(65) Prior Publication Data
US 2017/0130151 A1    May 11, 2017

(30) Foreign Application Priority Data
Jun. 17, 2014    (KR) .................. 10-2014-0073227
Jun. 17, 2014    (KR) .................. 10-2014-0073229
(Continued)

(51) Int. Cl.
*F26B 3/04*    (2006.01)
*C10L 9/00*    (2006.01)
(Continued)

(52) U.S. Cl.
CPC ........ *C10L 9/00* (2013.01); *F26B 3/04* (2013.01); *F26B 17/026* (2013.01); *F26B 21/02* (2013.01);
(Continued)

(58) Field of Classification Search
CPC .......... F26B 3/04; F26B 17/026; F26B 21/02; F26B 23/002; F26B 25/002; C10L 9/00; C10L 2290/06; C10L 2290/08
(Continued)

(56) References Cited

U.S. PATENT DOCUMENTS 5,687,674 A * 11/1997 Johanntgen ............... F22D 1/36
110/234
5,956,858 A * 9/1999 Veal ......................... F26B 5/08
34/138
(Continued)

FOREIGN PATENT DOCUMENTS

CA    2951792 A1 * 12/2015 ............ C10B 57/10
JP    H07-126717 A    5/1995
(Continued)

*Primary Examiner* — Stephen M Gravini
(74) *Attorney, Agent, or Firm* — Novick, Kim & Lee, PLLC; Jae Youn Kim

(57) ABSTRACT

The present invention relates to a coal supply device for reducing dust of coal input for dry and supplying dispersing and supplying the coal in a system for drying coal using reheat steam, and more particularly, to a device to minimize dust when the coal is supplied to a multi-stage dryer from a coal constant feeder through a pulverizer in a multi-stage dryer for drying coal using reheat steam and disperse and supply the coal to a transfer device and a coal drying system in which coal which is primarily dried in the first coal dryer is inputted into the second coal dryer and thus is secondarily dried, includes a coal constant feeder supplying a predetermined amount of coal onto the upward surface of the first transfer plate; and a dust reducer constituted by an inlet pipe (Continued)

coupled to an outlet of the coal constant feeder by a bearing, a worm wheel coupled onto the outer periphery of the inlet pipe, a worm gear-coupled with the worm wheel and rotating with rotary force transferred from a motor, a curved pipe of which the top is coupled to the inlet pipe, and an outlet pipe coupled to the end of the curved pipe, wherein the dust reducer which rotates at the predetermined velocity reduces the velocity of the coal supplied by the coal constant feeder to minimize generation of dust from the coal input onto the upward surface of the first transfer plate.

16 Claims, 32 Drawing Sheets

(30) Foreign Application Priority Data

| Nov. 28, 2014 | (KR) | ......................... | 10-2014-0168637 |
|---|---|---|---|
| Jan. 2, 2015 | (KR) | ......................... | 10-2015-0000090 |
| Jan. 2, 2015 | (KR) | ......................... | 10-2015-0000095 |

(51) Int. Cl.
*F26B 17/02* (2006.01)
*F26B 23/00* (2006.01)
*F26B 21/02* (2006.01)
*F26B 25/00* (2006.01)

(52) U.S. Cl.
CPC .......... *F26B 23/002* (2013.01); *F26B 25/002* (2013.01); *C10L 2290/06* (2013.01); *C10L 2290/08* (2013.01)

(58) Field of Classification Search
USPC ............................................................ 34/212
See application file for complete search history.

(56) References Cited

U.S. PATENT DOCUMENTS

| 5,987,776 | A | * | 11/1999 | Holcombe | ................ F26B 7/00 34/330 |
|---|---|---|---|---|---|
| 6,152,054 | A | * | 11/2000 | Ashworth | ............... F23C 3/008 110/233 |
| 7,987,613 | B2 | * | 8/2011 | Ness | ......................... C10L 9/08 110/249 |
| 8,322,056 | B2 | * | 12/2012 | Causer | ............................ 122/22 |
| 8,371,041 | B2 | * | 2/2013 | Bonner | .................... C10L 5/04 110/229 |
| 9,181,509 | B2 | * | 11/2015 | Bland | ...................... C10L 5/366 |
| 9,309,477 | B2 | * | 4/2016 | Foss-Smith | ............... F23K 1/00 |
| 9,328,958 | B2 | * | 5/2016 | Bairong | ................. C10B 47/04 |
| 2016/0264896 | A1 | * | 9/2016 | Kim | ..................... F26B 15/146 |
| 2017/0130151 | A1 | * | 5/2017 | Kim | ......................... C10L 9/00 |
| 2017/0130152 | A1 | * | 5/2017 | Kim | ......................... C10L 9/00 |
| 2017/0145315 | A1 | * | 5/2017 | Kim | ......................... C10B 57/10 |
| 2017/0145316 | A1 | * | 5/2017 | Kim | ......................... C10L 9/00 |

FOREIGN PATENT DOCUMENTS

| KR | 10-1998-0073288 A | 11/1998 | | |
|---|---|---|---|---|
| KR | 10-0960793 B1 | 6/2010 | | |
| KR | 10-1053654 B1 | 8/2011 | | |
| KR | 10-1075980 B1 | 10/2011 | | |
| KR | 10-1207726 B1 | 12/2012 | | |
| KR | 10-1408147 B1 | 6/2014 | | |
| WO | WO 2015194860 A1 | * 12/2015 | ............. | C10B 57/10 |

* cited by examiner

APPARATUS FOR DUST REDUCTION AND DISPERSION SUPPLY OF INPUT COAL IN SYSTEM FOR DRYING COAL USING REHEAT STEAM

TECHNICAL FIELD

The present invention relates to a coal supply device for reducing dust of coal input for dry and supplying dispersing and supplying the coal in a system for drying coal using reheat steam, and more particularly, to a device to minimize dust when the coal is supplied to a multi-stage dryer from a coal constant feeder through a pulverizer in a multi-stage dryer for drying coal using reheat steam and disperse and supply the coal to a transfer device.

BACKGROUND ART

In general, a thermal power plant generating power by using coal as fuel combusts coal of approximately 180 ton/hr per 500 MW and supplies coal equivalent to approximately 37 ton per one pulverizer to a boiler. In the 500 MW thermal power plant using the coal, approximately 6 coal storages having a capacity of approximately 500 ton are installed and in 5 coal storages, the coal is normally supplied and one remaining coal storage is operated as a coal yard capable of reserving coal which may be preliminarily used during a predetermined period.

Moreover, in the thermal power plant using the coal as the fuel, a standard thermal power design criterion for the coal is designed to use low-moisture bituminous coal of 6,080 Kcal/Kg and 10% or less. In some thermal power plant, imported coal is used and some bituminous coal among the imported coal average moisture content of 17% or more may be provided to decrease combustion efficiency of the boiler. When a calorific value of coal using 5,400 Kcal/Kg as a standard thermal power combustion limit is low, it is anticipated that a power generation amount decreases and fuel consumption increases due to the decrease in combustion efficiency. Moreover, when subbituminous coal which is high-moisture low calorific coal is used, a moisture content is higher than a design criterion, and as a result, a transport system transporting the coal is not smooth and when the coal is pulverized by the pulverizer, efficiency decreases and the combustion efficiency decreases due to partial incomplete combustion, and unbalance of heat distribution, which occurs in the boiler and the boiler may also operate in an abnormal state. However, in the thermal power plant, a use weight of the subbituminous coal gradually increases up to approximately 41 to 60% in order to reduce fuel cost.

Further, preference to the thermal power plant increases due to anticipations of a global business recovery and confronting a safety problem due to breakage of a nuclear power plant by a big earthquake of Japan, and as a result, it is expected that the demand and cost of the coal will continuously increase. As an environment of a global coal market is changed from a consumer to a supplier, stable supply and demand of the coal are actually difficult and a yield of the high caloric coal is prospected to be maintained at a current level, and as a result, the unbalance of the supply and demand of the coal is anticipated.

The low caloric coal in total global coal deposits is approximately 47% and the deposits are large, but the caloric value is small and the moisture content is high, and as a result, it is difficult to completely combust the high-moisture low caloric coal due to a combustion failure, and the like during combustion. Therefore, the high-moisture low caloric coal is disregarded on the market. Globally, a tendency to depend on a stable price of petroleum and low-priced production cost of the nuclear power generation has been high in recent years, but construction of a lot of thermal power plants using the coal has been planned due to a rapid increase of a petroleum price and anxiety about the nuclear power generation in recent years.

As a technique (thermal drying) that dries the coal in the related art, a rotary drying method that dries coal particles in a cylindrical shell with high-temperature gas while rotating the cylindrical shell into which the coal is input, a flash (pneumatic) drying method that dries the coal by lifting the high-temperature dry gas from the bottom to the top while supplying the coal from the top to the bottom, and a fluid-bed drying method that dries the coal while the high-temperature dry gas is lifted up while accompanying minute particles are primarily used.

The coal is divided into surface moisture attached to a porosity between the coal particles and coupling moisture coupled to air holes in the coal. As the surface moisture, most moisture sprayed during a washing process, and transport and storage in a district and the amount of the surface moisture is determined according to a surface area and absorptiveness and as the particles are smaller, the surface area increases and a capillary is formed between the particles to contain the moisture, thereby increasing the moisture content. The coupling moisture is formed at a generation time of the coal and the amount of the coupling moisture is the smaller in the order of brown coal, soft coal (bituminous coal and subbituminous coal), and anthracite coal. When the coal has much moisture, the caloric value decreases and transport cost increases, and as a result, controlling the moisture is required during processes such as mixture, pulverization, separation, and the like of the coal.

Moreover, in a multi-stage dryer, that is, a device that dries the coal by spaying high-temperature reheat stream below a dryer while transporting the pulverized coal through a conveyor with a plurality of through-holes through which reheat steam passes or a plurality of coupled transport plates, even though the reheat is dispersed while the injected coal is not evenly dispersed, the moisture included in the coal cannot be effectively dried. As a result, the number of stages and the length of the dryer for drying the coal needs to be increased and a supply amount of the reheat steam for drying increases, cost and time required for drying the coal increase.

Further, when pulverized coal is supplied to the dryer in order to dry the coal, coal particles are scattered and the dust is thus generated. The dust acts as environmental contamination or causes malfunction of a coal drying system. Further, frequency cleaning depending on maintenance of the coal drying system is also accompanied.

As the prior art related with the present invention, in Korean Patent Registration No. 10-0960793, in a low-grade coal stabilization device, a wave-type oscillating flow plate for uniformly mixing primarily dried low-grade coal with heavy oil powder input for increasing dry efficiency is provided. The oscillating flow plate may evenly mix the low-grade coal and the heavy oil powder and there is a problem in that dried steam for drying the coal is not uniformly injected on the coal surface and thus dry efficiency may be decreased.

DISCLOSURE

Technical Problem

An embodiment of the present invention is directed to improve a drying function of a coal drying system by preventing dust from generated and dispersing and supplying the coal at a predetermined ratio when the coal is supplied to a dryer from a coal constant feeder in the coal drying system that dries the coal with reheat steam while feeding coal used as fuel of a thermal power plant to the dryer.

Another embodiment of the present invention is directed to reduce fuel consumption by maintaining an optimum water content of coal due to effective drying of coal to enhance a calorific value of coal and improving combustion efficiency of a boiler of the thermal power plant.

Yet embodiment of the present invention is directed to provide a drying technology to prevent environmental problems due to incomplete combustion of coal by controlling moisture contained in coal and a technology applied to the thermal power plant.

Technical Solution

According to an aspect of the present invention, provided is apparatus for dust reduction and dispersion supply of input coal in a system for drying coal using reheat steam including a first coal dryer in which a pair of first drive sprockets and a pair of first driven sprockets are spaced apart from each other at a predetermined distance to be fastened to first chains, respectively, a plurality of transfer plates is hinge-coupled between the first chains, a pair of first guide rails horizontally supporting the first transfer plate is installed below an upper second chain connected between the first drive sprocket and the first driven sprocket, a pair of second guide rails horizontally supporting the first transfer plate is installed below a lower first chain connected between the first drive sprocket and the first driven sprocket, a first steam chamber injecting reheat steam supplied from a reheater is installed below the upper first chain, a second steam chamber injecting reheat steam supplied from the reheater is installed below the lower first chain, a first exhaust gas chamber collecting exhaust gas is installed on the upper first chain, and a second exhaust gas chamber collecting exhaust gas is installed on the lower first chain, and a second coal dryer in which a pair of second drive sprockets and a pair of second driven sprockets are spaced apart from each other at a predetermined distance to be fastened to second chains, respectively, a plurality of transfer plates is hinge-coupled between the second chains, a pair of second guide rails horizontally supporting the second transfer plate is installed below an upper second chain connected between the second drive sprocket and the second driven sprocket, a pair of second guide rails horizontally supporting the second transfer plate is installed below a lower second chain connected between the second drive sprocket and the second driven sprocket, a third steam chamber injecting reheat steam supplied from the reheater is installed below the upper second chain, a fourth steam chamber injecting reheat steam supplied from the reheater is installed below the lower second chain, a third exhaust gas chamber collecting exhaust gas is installed on the upper second chain, and a fourth exhaust gas chamber collecting exhaust gas is installed on the lower second chain, wherein coal which is primarily dried in the first coal dryer is inputted into the second coal dryer and thus is secondarily dried, and including: a coal constant feeder supplying a predetermined amount of coal onto the upward surface of the first transfer plate; and a dust reducer constituted by an inlet pipe coupled to an outlet of the coal constant feeder by a bearing, a worm wheel coupled onto the outer periphery of the inlet pipe, a worm gear-coupled with the worm wheel and rotating with rotary force transferred from a motor, a curved pipe of which the top is coupled to the inlet pipe, and an outlet pipe coupled to the end of the curved pipe, wherein the dust reducer which rotates at the predetermined velocity reduces the velocity of the coal supplied by the coal constant feeder to minimize generation of dust from the coal input onto the upward surface of the first transfer plate.

Further, in the present invention, the apparatus may further include a dispersion feeder fixedly installed below the dust reducer with a fixation member, having an inclination angle having a predetermined angle from the top to the bottom, and having a shape in which the dispersion feeder is widened from the top to the bottom, wherein the dust reducer which rotates at the predetermined velocity reduces the velocity of the coal supplied by the coal constant feeder and thereafter, supplies the coal to the dispersion feeder and the dispersion feeder evenly distributes and supplies the coal onto the upward surface of the first plate.

In addition, in the present invention, a plurality of protrusions or embossings may be formed to protrude on the surface of the dispersion feeder at a predetermined interval.

Moreover, in the present invention, a concave-convex having mountains and valleys formed at a predetermined interval may be formed on the surface of the dispersion feeder.

Furthermore, in the present invention, the dispersion feeder may be installed in a direction in which the first transfer plate is transferred or an opposite direction thereto.

Further, in the present invention, the apparatus may further include a dispersion feeder including a power generator installed on one side of the dust reducer and below the dust reducer, and a conical dispersion disk axially coupled with a rotational shaft coupled to the top of the center and a power shaft of the power generator and receiving the power generated by the power generator through the rotational shaft to rotate forward/backward at a predetermined angle, wherein the dust reducer which rotates at the predetermined velocity reduces the velocity of the coal supplied by the coal constant feeder and thereafter, supplies the coal to the dispersion feeder and the dispersion feeder evenly distributes and supplies the coal onto the upward surface of the first plate by the dispersion disk which rotates forward/backward at the predetermined angle.

In addition, in the present invention, the power generator may include a forward/backward motor generating predetermined forward rotary power and reverse rotary power, a conversion gear box decelerating the rotary power output from the forward/reverse motor and converting a rotary motion into a linear reciprocating motion, a rack gear axially coupled to the conversion gear box, and a pinion gear coupled to the rotary shaft and engaged with the rack gear.

In addition, in the present invention, the power generator may include a forward/backward motor generating predetermined forward rotary power and backward rotary power, a worm axially coupled to the forward/backward motor, and a worm wheel coupled to the rotary shaft and engaged with the worm.

Moreover, in the present invention, the power generator may include an actuator generating the linear reciprocating motion, a worm axially coupled to the actuator, and a worm wheel coupled to the rotary shaft and engaged with the worm.

In addition, in the present invention, the concave-convex having the mountains and valleys formed at a predetermined interval radially around the rotational shaft may be formed on the surface of the dispersion disk.

Further, in the present invention, a cover for preventing coal dust from being scattered may be installed on the outer part including the dispersion feeder.

Moreover, in the present invention, as the curved pipe, any one having pipe cross-sections of a zigzag shape, a twist shape, and a spiral shape may be adopted.

Further, in the present invention, the inlet pipe and the outlet pipe may be installed on the same central axis.

Moreover, in the present invention, as the motor, a forward/backward motor which rotates forward or backward may be adopted.

Further, in the present invention, the entirety of the dust reducer other than the worm wheel, the worm, and the outlet pipe may be installed in a case.

In addition, in the present invention, a first transfer roller may be hinge-coupled between two-side centers of the first transfer plate and the first chains, respectively, at left and right sides of the first transfer roller, first auxiliary rollers may be hinge-coupled with the sides of the first transfer plate, respectively, the first transfer rollers may be hinge-coupled between both centers of the second transfer plate and the second chains, respectively, at left and right sides of the second transfer roller, second auxiliary rollers may be hinge-coupled with the sides of the second transfer plate, respectively, a first guide bar rotating and up-supporting the lower first transfer plate separated from the second guide rail in one direction may be installed from the top to the bottom of the first drive sprocket along the side, a second guide bar rotating and down-supporting the upper first transfer plate separated from the first guide rail may be installed from the bottom to the top of the first driven sprocket along the side, a third guide bar rotating and up-supporting the lower second transfer plate separated from the fourth guide rail in one direction may be installed from the top to the bottom of the second drive sprocket along the side, and a fourth guide bar rotating and down-supporting the upper second transfer plate separated from the third guide rail may be installed from the bottom to the top of the second driven sprocket along the side.

Advantageous Effects

According to the present invention, discharge of contaminated or pollutant materials by dust are minimized by preventing the dust from being generated while supplying coal onto a transfer plate for transferring the coal feeding to resolve environmental problems, high-temperature reheat steam easily contact coal particles by supplying the coal onto the surface of the transfer plate at a predetermined ratio to prevent incomplete combustion of the coal by removing moisture that remains at the inside and outside of the coal as used fuel of a thermal power plant by efficiently drying hot reheat steam, improving a caloric value of the coal and minimize emission of the pollutant materials, prevent ignition or spontaneous ignition of the coal by the dust, and enhance stability in supplying the coal by increasing utilization of low-grade coal with low demand. Further, by the coal drying system adopting a coal supplying device for reducing the dust, it is possible to use low calorific coal which is cheaper than high calorific coal, reduce fuel costs and costs due to reduction in coal import amount, and reduce emission of waste and pollutants generated from exhaust gas and reduce carbon dioxide by relatively decreasing coal consumption.

BEST MODE FOR THE INVENTION

Hereinafter, an apparatus for dust reduction and dispersion supply of input coal in a system for drying coal using reheat steam according to the present invention will be described in detail with reference to the accompanying drawings.

According to the present invention, when coal is input in a transfer device such as a conveyor or a transfer plate, generation of dust of the coal is minimized and the coal is dispersed and supplied. Moreover, an apparatus for dispersion supply and dust reduction is installed in a coal drying system that dries the coal by injecting high-temperature reheat steam while transferring the coal by inputting the coal in the transfer device in a coal constant feeder supplying pulverized coal with a predetermined amount.

Figure 1:
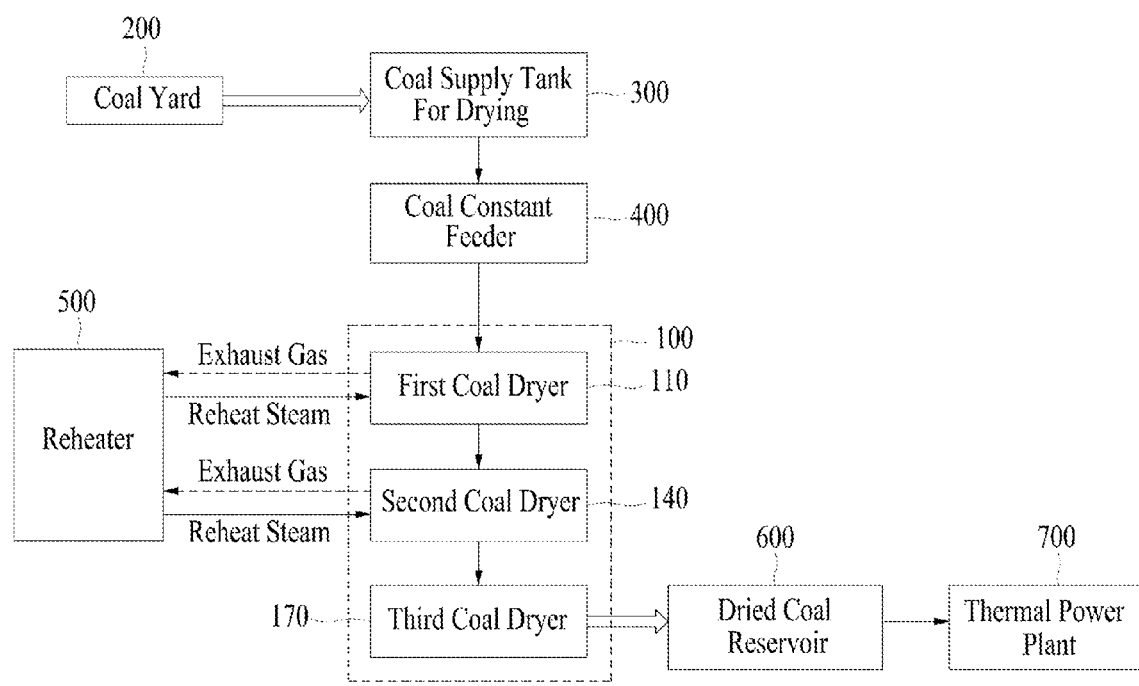
FIG. 1 is a block diagram illustrating a system for drying coal using reheat steam according to the present invention.

In FIG. 1, a coal yard 200 keeps and stores coal used as boiler fuel of a thermal power plant. The coal contains surface moisture and internal moisture. Further, the coal stored in the coal yard 200 is periodically sprayed with water to prevent scattering of coal dust. The coal stored in the coal yard 200 is transferred to a coal drying system 100 through a transfer means such as a conveyor system. In this case, the coal in the coal yard 200 from which the moisture is removed may be transferred and stored into a coal supply tank 300 for drying connected with the coal drying system. In addition, the coal stored in the coal supply tank 300 is supplied to the coal drying system 100 from a coal constant feeder 400 with a predetermined amount. The coal drying system 100 includes a third coal dryer 170 for naturally drying the coal discharged through a first coal dryer 110 and a second coal dryer 170 installed in multiple layers. The first coal dryer 110 and the second coal dryer 140 have substantially the same structure. The coal naturally dried through the third coal dryer 170 is stored in a dried coal reservoir 600 and then, supplied as boiler fuel of a thermal power plant 700.

Figure 2:
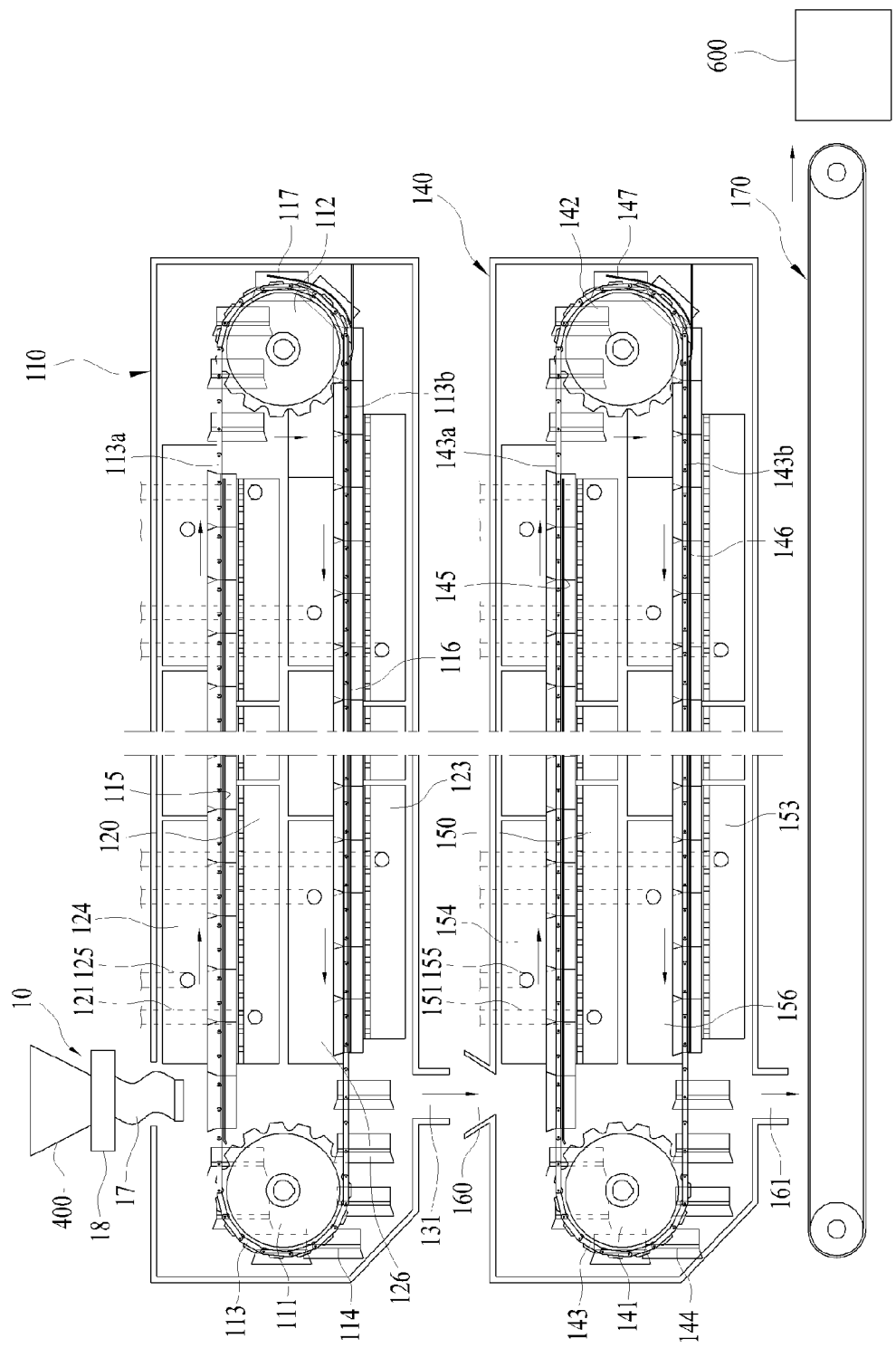
FIG. 2 is a configuration diagram illustrating a front side of the system for drying coal using reheat steam, as a first embodiment of the present invention.
Figure 3:
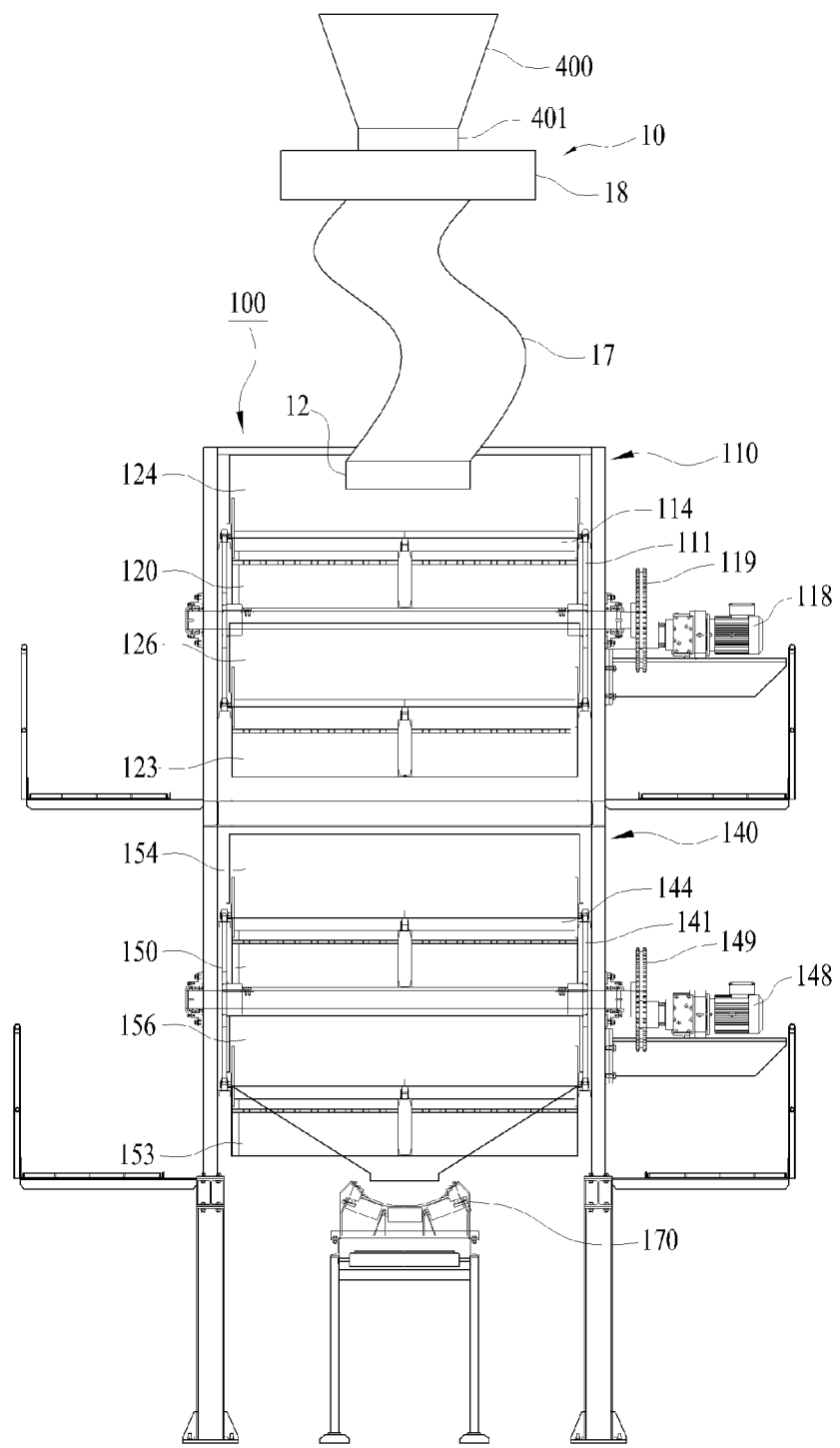
FIG. 3 is a configuration diagram illustrating the side of the system for drying coal using reheat steam according to the present invention.

FIGS. 2 and 3 illustrate an example of the coal drying system 100 in which a dust reducer 10 for reducing the dust is installed according to the present invention. The coal drying system 100 includes a multi-stage dryer, that is, the first coal dryer 110 drying the coal input from the coal constant feeder 400, the second coal dryer 140 secondarily drying the coal dried by the first coal dryer, and the third coal dryer 170 naturally drying the coal dried by the second coal dryer and then, supplying the dried coal to the dried coal reservoir 50.

In the first coal dryer 110, a pair of first drive sprockets 111 and a pair of first driven sprockets 112 are spaced apart from each other at a predetermined distance to be fastened to first chains 113, respectively, a plurality of transfer plates 114 is hinge-coupled between the first chains 113, a pair of first guide rails 115 horizontally supporting the first transfer plate 114 is installed below an upper second chain 143 connected between the first drive sprocket 111 and the first driven sprocket 112, a pair of second guide rails 116 horizontally supporting the first transfer plate 114 is installed below a lower first chain 113 connected between the first drive sprocket 111 and the first driven sprocket 112, a first steam chamber 120 injecting reheat steam supplied from a reheater 500 is installed below the upper first chain 113, a second steam chamber 123 injecting reheat steam supplied from the reheater 500 is installed below the lower first chain 113, a first exhaust gas chamber 124 collecting exhaust gas is installed on the upper first chain 113, and a second exhaust gas chamber 126 collecting exhaust gas is installed on the lower first chain 113.

In addition, in the second coal dryer 140, a pair of second drive sprockets 141 and a pair of second driven sprockets 142 are spaced apart from each other at a predetermined distance to be fastened to second chains 143, respectively, a plurality of transfer plates 144 is hinge-coupled between the second chains 143, a pair of second guide rails 145 horizontally supporting the second transfer plate 144 is installed below an upper second chain 143 connected between the second drive sprocket 141 and the second driven sprocket 142, a pair of second guide rails 146 horizontally supporting the second transfer plate 144 is installed below a lower second chain 143 connected between the second drive sprocket 141 and the second driven sprocket 142, a third steam chamber 150 injecting reheat steam supplied from the reheater 500 is installed below the upper second chain 143, a fourth steam chamber 153 injecting reheat steam supplied from the reheater 500 is installed below the lower second chain 143, a third exhaust gas chamber 154 collecting exhaust gas is installed on the upper second chain 143, and a fourth exhaust gas chamber 156 collecting exhaust gas is installed on the lower second chain 143.

In addition, in the first transfer plate 114, a plurality of through-holes 114a is formed so that the reheat steam injected from the first steam chamber 120 and the second steam chamber 123 passes through the first transfer plate 114 to contact the coal particles. At upper left and right sides of the first transfer plate 114, a guard 114b having a predetermined height is installed to prevent the input coal pile from flowing in a left or right direction of the first transfer plate 114. The guard 114b has a shape that is narrow at the top and widened at the bottom as a substantially trapezoidal shape. Accordingly, the top of the guard 114b of the first transfer plate 114 is overlapped with an adjacent guard 114b. In this case, the guard 114b of the first transfer plate 114 is installed in a substantially zigzag direction with the adjacent guard 114b. Further, at lower left and right sides of the first transfer plate 114, shield plates 114c are installed to prevent the reheat steam injected from the first steam chamber 120 and the second steam chamber 123 from being lost when injected to left and right sides of each of the first steam chamber 120 and the second steam chamber 123.

In addition, in the second transfer plate 144, a plurality of through-holes 144a is formed so that the reheat steam injected from the third steam chamber 150 and the fourth steam chamber 153 passes through the second transfer plate 144 to contact coal particles. At upper left and right sides of the second transfer plate 144, guards 144b having a predetermined height are installed to prevent the input coal pile from flowing in a left or right direction of the second transfer plate 144. The guard 144b has a shape that is narrow at the top and widened at the bottom as a substantially trapezoidal shape. Accordingly, the top of the guard 144b of the second transfer plate 144 is overlapped with an adjacent guard 144b. In this case, the guard 144b of the second transfer plate 144 may be installed in a substantially zigzag direction with the adjacent guard 144b. Further, at lower left and right sides of the second transfer plate 144, shield plates 144c are installed to prevent the reheat steam injected from the third steam chamber 150 and the fourth steam chamber 153 from being lost when injected to left and right sides of each of the third steam chamber 150 and the fourth steam chamber 153.

A first embodiment of the apparatus for dust reduction and dispersion supply of input coal in a system for drying coal using reheat steam according to the present invention will be described with reference to FIGS. 4 to 6.

Figure 4:
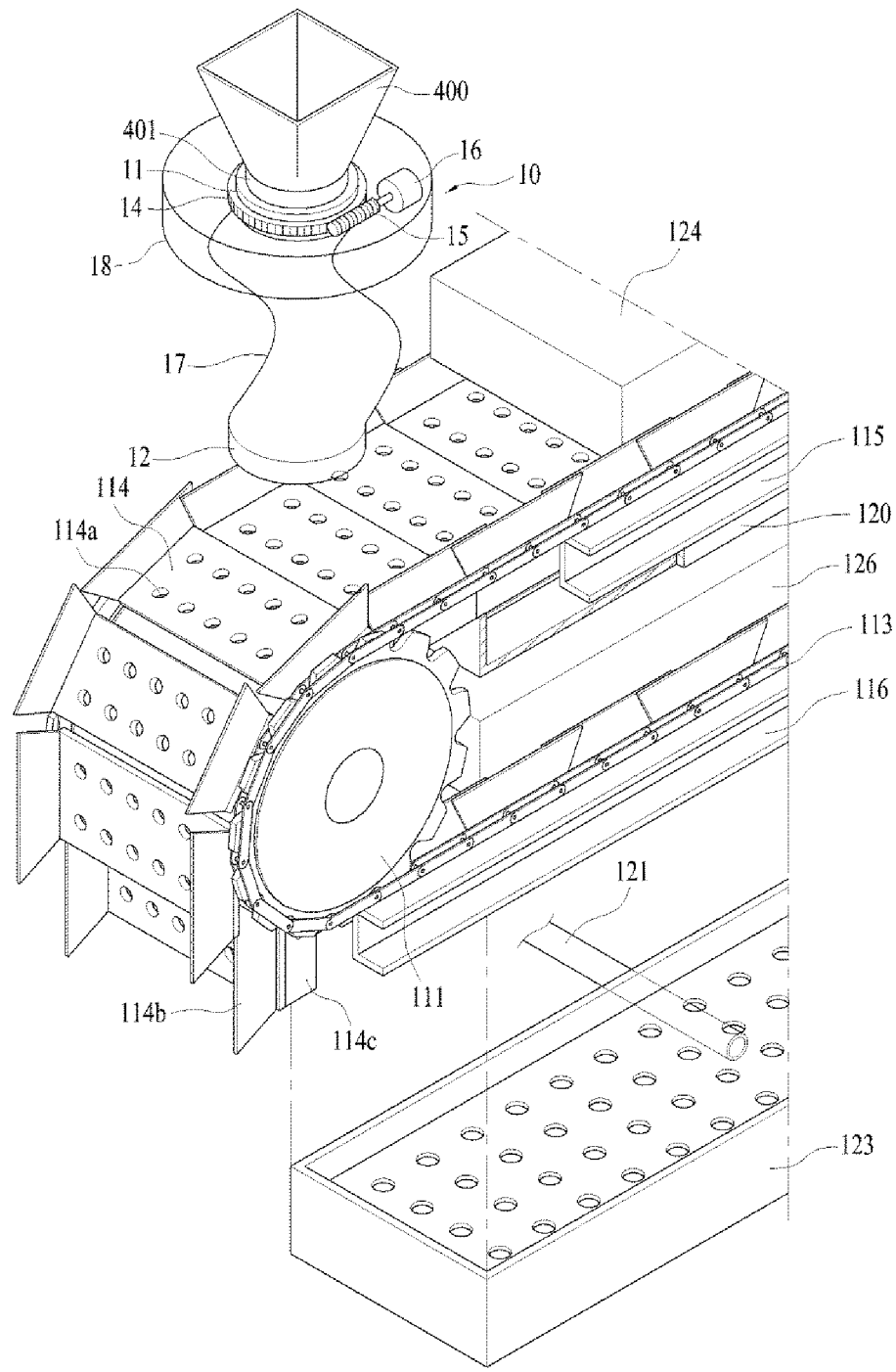
FIG. 4 is a perspective view illustrating a main part where a dust reducer is installed in the system for drying coal using reheat steam according to the present invention.

First, in FIG. 4, the dust reducer 10 is installed on the bottom of the coal constant feeder 400. The dust reducer 10 is installed to be spaced apart from the upward surfaces of the plurality of first transfer plates 114 of the first coal dryer 110 by a predetermined gap.

Figure 5:
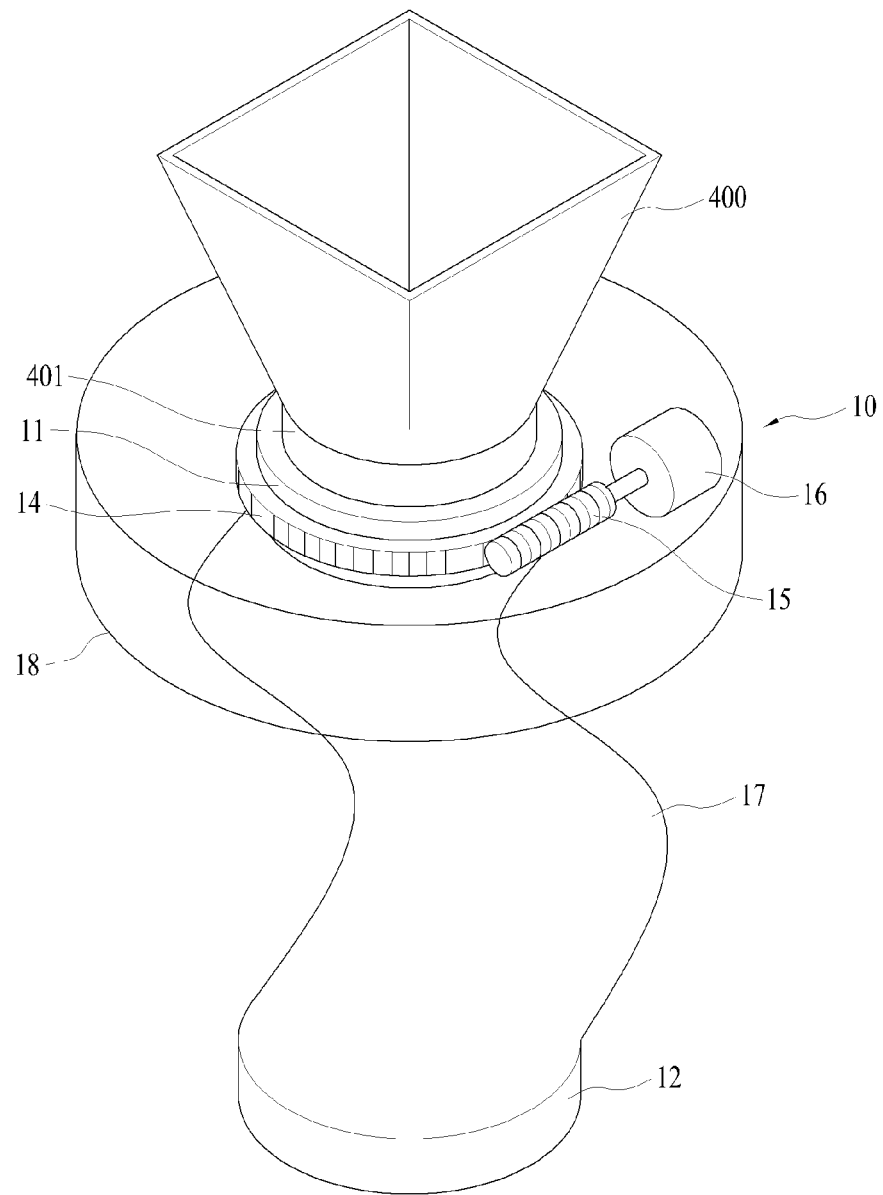
FIG. 5 is a perspective view illustrating the dust reducer according to the present invention.

In FIG. 5, the dust reducer 10 decreases a velocity at which the coal is input onto the upward surface of the first transfer plate 114 by rotating a predetermined amount of coal supplied by the coal constant feeder 400 to suppress the generation of the dust.

Figure 6:
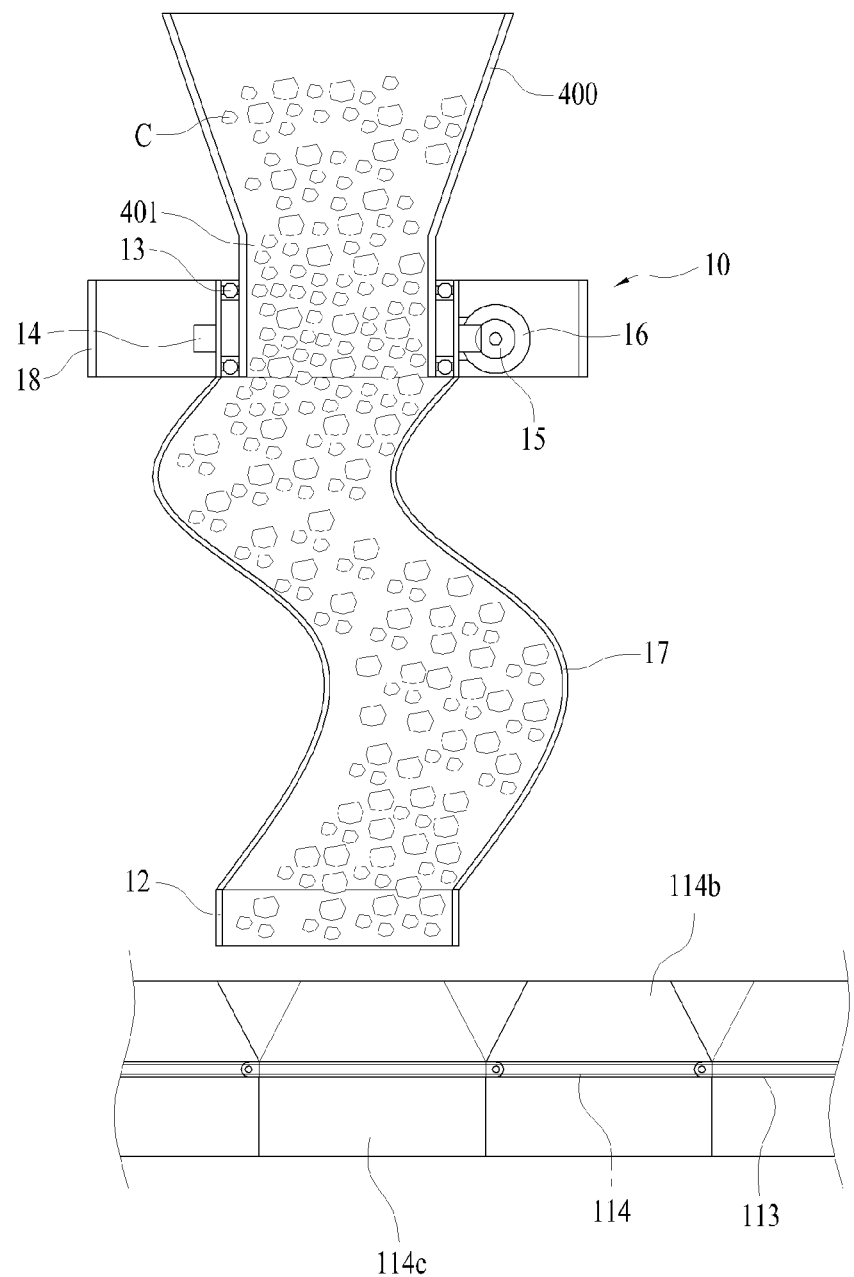
FIG. 6 is a cross-sectional view illustrating an operation of the dust reducer according to the present invention.
Figure 7:
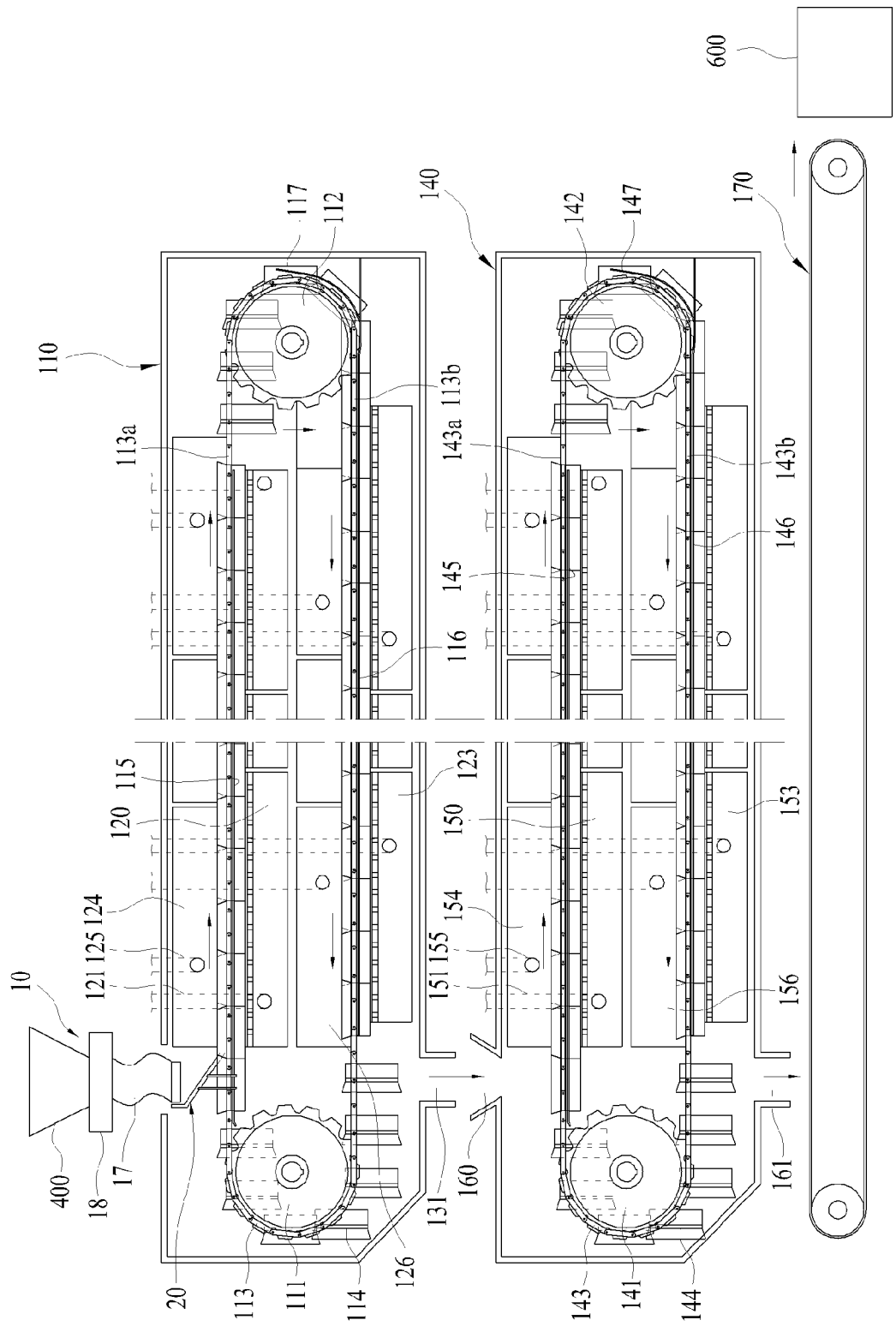
FIG. 7 is a configuration diagram illustrating a front side of the system for drying coal using reheat steam, as a second embodiment of the present invention.

Moreover, in FIG. 6, an inlet pipe 11 of the dust reducer 10 is coupled to an outlet 401 of the coal constant feeder 400 by a bearing 13. A worm wheel 14 is coupled on the outer periphery of the inlet pipe 11. A worm 15 is engaged in a gear formed on the outer periphery of the worm wheel 14. The worm 15 is gear-coupled with the worm wheel 14 and rotates at a predetermined velocity with rotary force transferred from a motor 16. The worm wheel 14 is gear-coupled with the worm 15 at a predetermined gear ratio and the worm wheel 14 reduces a rotary velocity of the worm 15. The motor 16 which generates the rotary force in a predetermined direction may rotate forward or backward. The top of a curved pipe 17 is coupled to the inlet pipe 11. The curved pipe 17 has a shape in which the curved pipe 17 is bent in a predetermined direction. A pipe cross-section of the curved pipe 17 may have any one of a zigzag shape, a twist shape, and a spiral shape. The curved pipe 17 reduces a velocity at which a coal pile C is supplied by changing a direction of the coal pile C supplied by the coal constant feeder 400. Moreover, the curved pipe 17 may be bent or twisted at least twice or more. An outlet pipe 12 is coupled to the end of the curved pipe 17. The outlet pipe 12 decides a direction in which the coal dummy C is input onto the first transfer plate 114. Further, the inlet pipe 11 and the outlet pipe 12 may be installed on substantially the same central axis.

In addition, a case 18 may be installed to seal the worm wheel 14, the worm 15, and the motor 16 installed on the outer peripheral of the inlet pipe 11 of the dust reducer 10. This is to prevent loss or malfunction of the worm wheel 14, the worm 15, and the motor 16 by the dust which may be generated when the coal pile C is supplied onto the surface of the first transfer plate 114. Further, the case 18 may be preferably configured to seal all portions other than the outlet pipe 12 of the dust reducer 10.

In the coal supply device for reducing the dust in the coal drying system of the present invention, which is configured as such, the coal pile C is vertically input through the outlet 401 of the coal constant feeder 400 by gravity. In this case, while the coal pile C passes through the curved shape 17 of the dust reducer 10, the input velocity of the coal pile C is reduced. That is, the coal pile C input through the outlet 401 is supplied in a left direction while contacting a pipe which protrudes from the right side to the left side in the curved pipe 17 and supplied in a right direction while contacting a pipe which protrudes fro the left side to the right side in the curved pipe 17 again and thereafter, supplied onto the first transfer plate 114 through the outlet pipe 12. The coal pile C is supplied through the outlet pipe 12 after the velocity of the coal pile C is reduced while changing the direction several times according to the number of bending or twisting times of the curved pipe 17.

Further, in the dust reducer 10, the worm wheel 14 rotates by the rotary force of the worm 15 coupled to a rotary shaft of the motor 16, and as a result, the inlet pipe 11 on which the worm wheel 14 rotates. The rotation of the inlet pipe 11 rotates the curved pipe 17 and the outlet pipe 12. The supply of the coal pile C which is further reduced by an influence by the bent or twisted curved pipe 17 and the rotary force of the curved pipe 17 passing through the dust reducer 10 is provided, and as a result, the velocity of the coal pile C supplied onto the surface of the first transfer plate 114 is finally reduced to minimize the generation of the dust.

Next, a second embodiment of the apparatus for dust reduction and dispersion supply of input coal in a system for drying coal using reheat steam according to the present invention will be described with reference to FIGS. 7 to 16.

Figure 8:
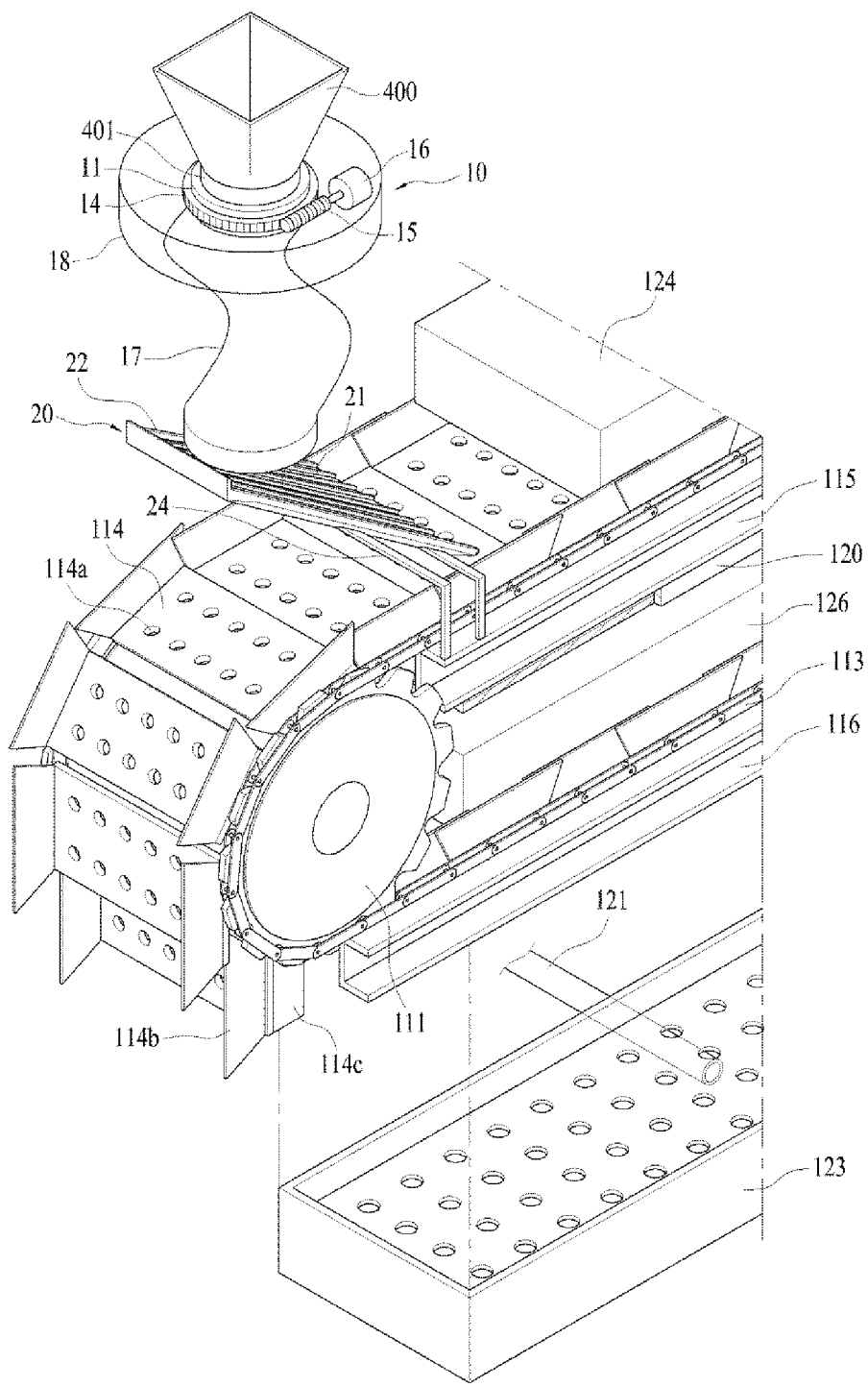
FIG. 8 is a perspective view illustrating a main part where the dust reducer and a dispersion feeder are installed in the system for drying coal using reheat steam according to the present invention.

First, in FIG. 8, the dust reducer 10 is installed on the bottom of the coal constant feeder 400. The dust reducer 10 is installed to be spaced apart from the upward surfaces of the plurality of first transfer plates 114 of the first coal dryer 110 by a predetermined gap. Further, a dispersion feeder 20 is installed below the dust reducer 10. Accordingly, the coal supplied by the coal constant feeder 400 is dispersed by the dispersion feeder 20 with a predetermined amount after the dust is reduced by the dust reducer 10 to be supplied onto the upward surface of the first transfer plate 114.

Figure 9:
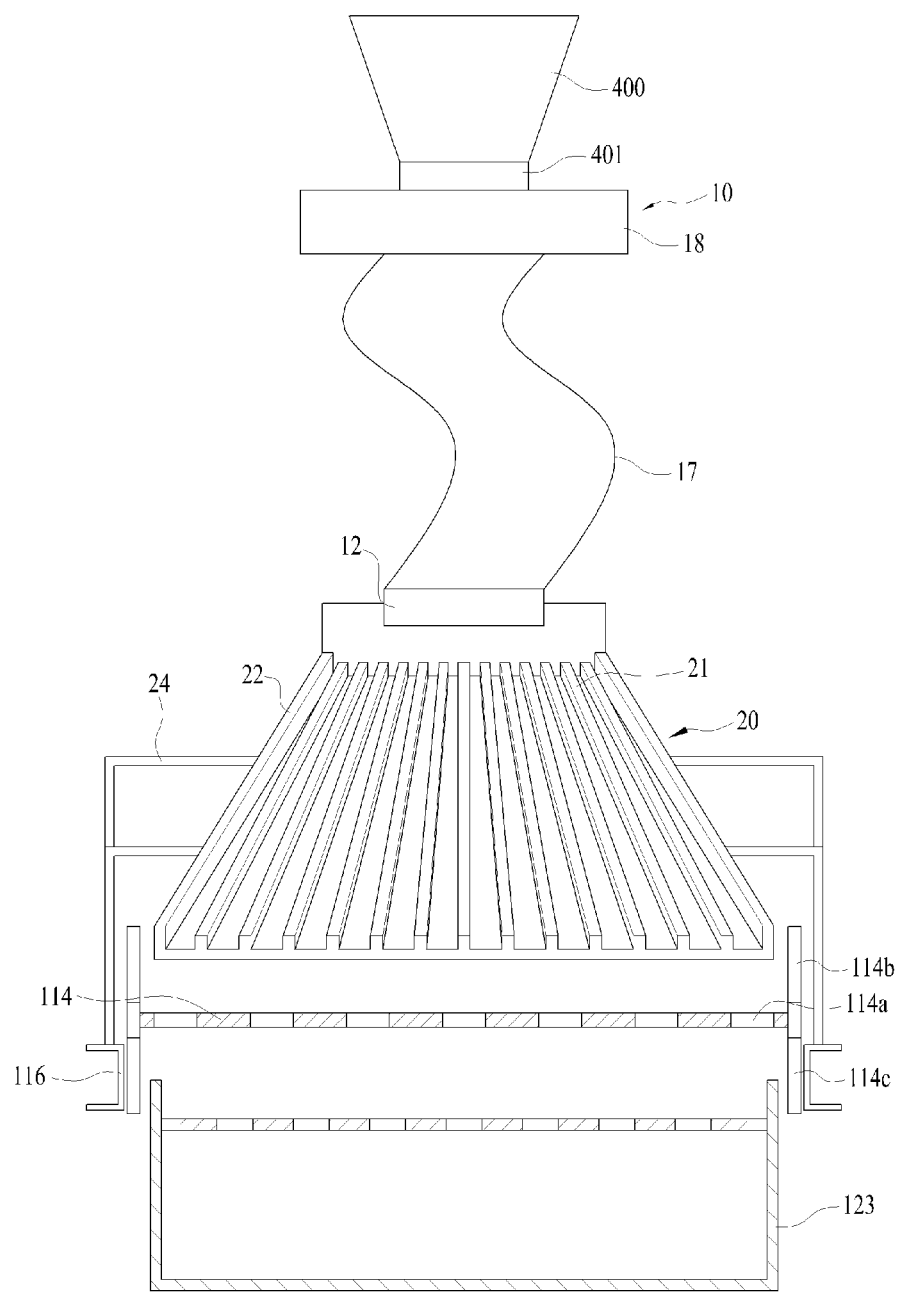
FIG. 9 is a side view illustrating the dust reducer and the dispersion feeder according to the present invention.
Figure 10:
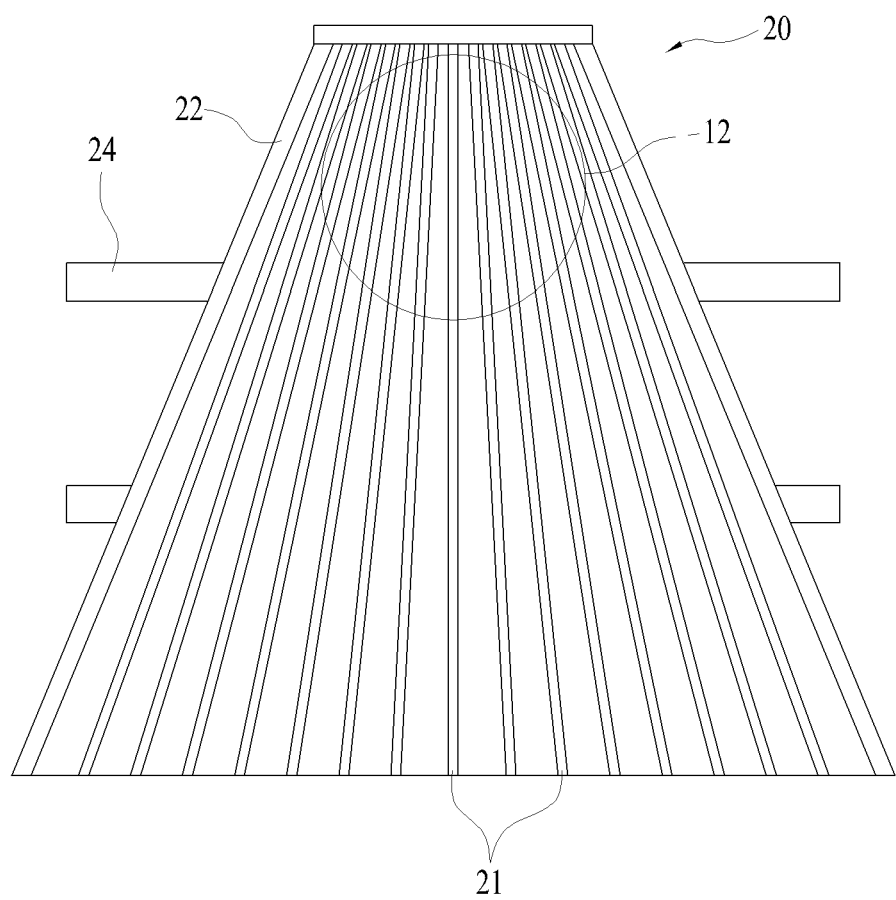
FIG. 10 is a plan view illustrating the dispersion feeder according to the present invention.

In FIG. 9, the dust reducer 10 decreases a velocity at which the coal is input onto the upward surface of the first transfer plate 114 by rotating a predetermined amount of coal supplied by the coal constant feeder 400 to suppress the generation of the dust.

Further, the dispersion feeder 20 is fixedly installed on the bottom with a pair of fixation members 24. The bottom of the fixation member 24 is fixed to one side of a guide rail 115 and the top of the fixation member 24 is fixedly coupled to the side of the dispersion feeder 20. The fixation members 24 may be installed at the front side and the rear side of the side the dispersion feeder 20, respectively. The dispersion feeder 20 has an inclination angle formed at a predetermined angle from the top to the bottom. That is, the coal pile C input from the dust reducer 10 slidably descends from the dispersion feeder 20 inclined at the predetermined angle to be supplied onto the surface of the first transfer plate 114. In addition, the dispersion feeder 20 has a shape in which the dispersion feeder 20 is widened from the top to the bottom. That is, the dispersion feeder 20 has a shape in which the coal pile C input from the top of the dispersion feeder 20 from the dust reducer 10 is received to be widely dispersed and supplied as large as the width of the first transfer plate 144.

Figure 14:
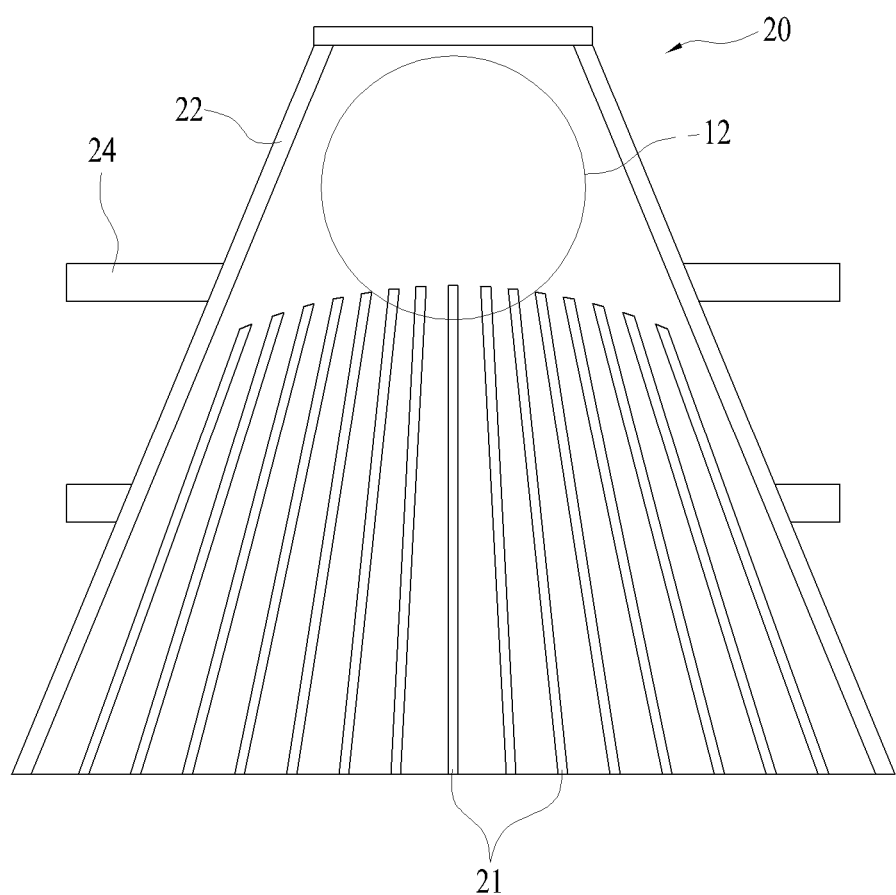

In FIG. 14, side plates 22 having a predetermined height are formed at the left side and the right side of the dispersion feeder 20 to prevent the coal pile C from being supplied to the left side or the right side of the dispersion feeder 20 without permission. A plurality of protrusions 21 are formed to protrude on the surface of the dispersion feeder 20. The protrusions 21 is formed to protrude in a fan blade shape on the surface of the dispersion feeder 20, and as a result, the coal pile C supplied to the center of the upper surface of the dispersion feeder 20 from the dust reducer 10 is evenly dispersed and supplied while being spread horizontally.

Moreover, the surface of the dispersion feeder 20 on which the plurality of protrusions 22 are formed to protrude at a predetermined interval may have an arc shape. That is, the center of the dispersion feeder 20 is formed to further protrude upward than the left side or the right side, and as a result, the coal pile C may be easily dispersed to the left side or the right side.

Figure 11:
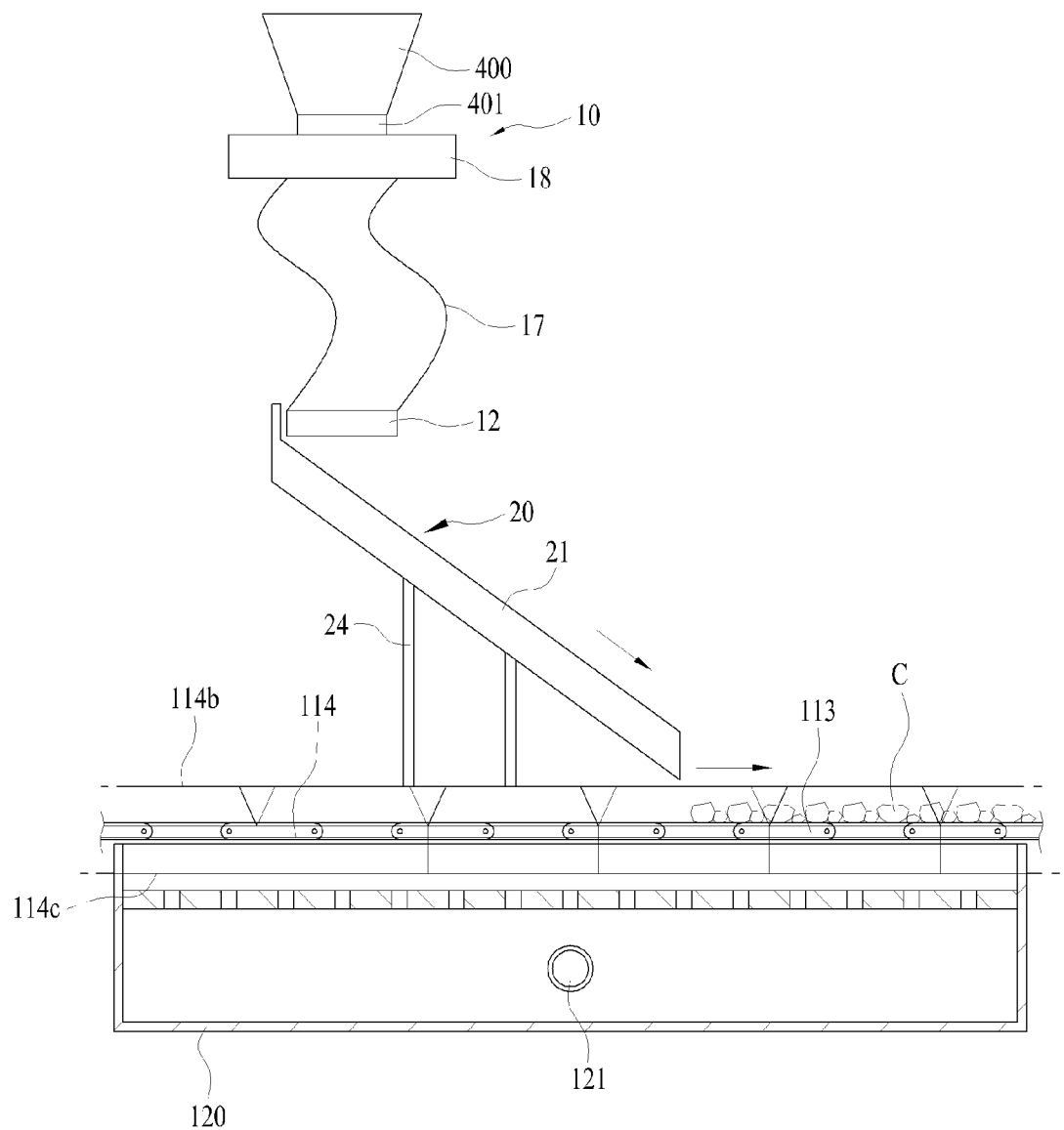
FIGS. 11 and 12 are side views illustrating operations of the dust reducer and the dispersion feeder according to the present invention.

Moreover, in FIG. 11, the dispersion feeder 20 is installed to supply the coal pile C in a direction which is the same as the transfer direction of the first transfer plate 114. When the dispersion feeder 20 is installed as such, the bottom of the dispersion feeder 20 may be installed to be approximately close to the surface of the first transfer plate 114.

Figure 12:
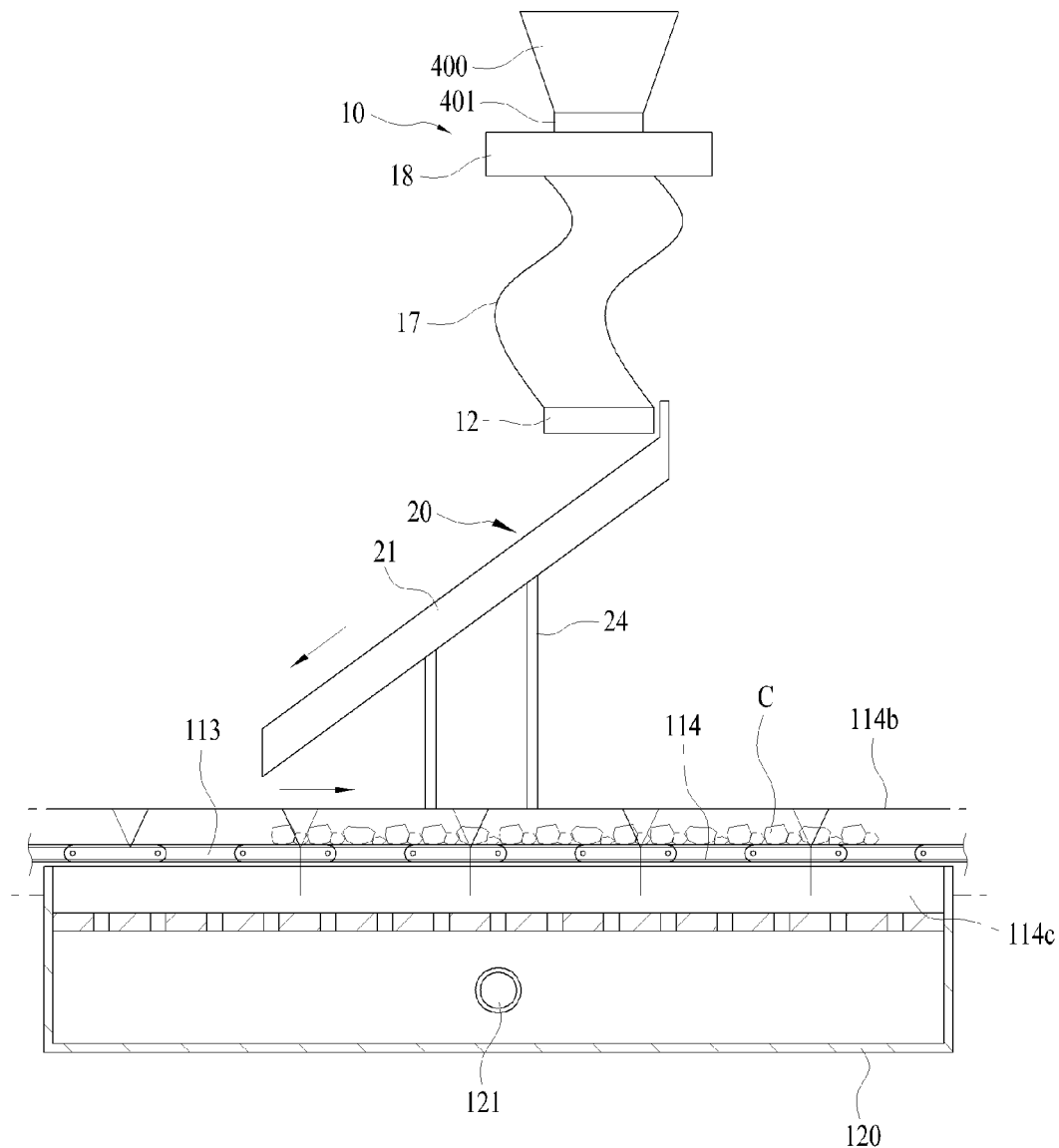

Moreover, in FIG. 12, the dispersion feeder 20 is installed to supply the coal pile C in a direction which is reverse to the transfer direction of the first transfer plate 114. When the dispersion feeder 20 is installed as such, the bottom of the dispersion feeder 20 may be installed at a predetermined height between the first transfer plates 114. In this case, when the coal pile C supplied to the first transfer plate 114 is supplied between the bottom of the dispersion feeder 20 and the top of the first transfer plate 114, the supply of the coal pile C may not be interfered by the dispersion feeder 20.

In the coal supply device for dust reduction and dispersion supply in the coal drying system according to the present invention, which is configured as such, the coal pile C is vertically input through the outlet 401 of the coal constant feeder 400 by the gravity. In this case, while the coal pile C passes through the curved shape 17 of the dust reducer 10, the input velocity of the coal pile C is reduced. That is, the coal pile C input through the outlet 401 is supplied in a left direction while contacting a pipe which protrudes from the right side to the left side in the curved pipe 17 and supplied in a right direction while contacting a pipe which protrudes fro the left side to the right side in the curved pipe 17 again and thereafter, supplied onto the first transfer plate 114 through the outlet pipe 12. The coal pile C is supplied through the outlet pipe 12 after the velocity of the coal pile C is reduced while changing the direction several times according to the number of bending or twisting times of the curved pipe 17.

Further, in the dust reducer 10, the worm wheel 14 rotates by the rotary force of the worm 15 coupled to a rotary shaft of the motor 16, and as a result, the inlet pipe 11 on which the worm wheel 14 rotates. The rotation of the inlet pipe 11 rotates the curved pipe 17 and the outlet pipe 12. The supply of the coal pile C which is further reduced by an influence by the bent or twisted curved pipe 17 and the rotary force of the curved pipe 17 passing through the dust reducer 10 is provided, and as a result, the velocity of the coal pile C supplied onto the surface of the first transfer plate 114 is finally reduced to minimize the generation of the dust.

Further, the dispersion feeder 20 evenly disperses the coal pile C input by the dust reducer 10 on the surface where the coal pile C is widely spread in the fan blade shape to be supplied onto the surface of the first transfer plate 114. The coal pile C is prevented from being supplied to only one place, that is, concentratively to one place by protrusions 22 formed on the surface of the dispersion feeder 20 at a predetermined interval and height or a concave-convex having mountains and a valleys formed at a predetermined interval to more effectively dry the coal by the reheat steam.

Figure 13:
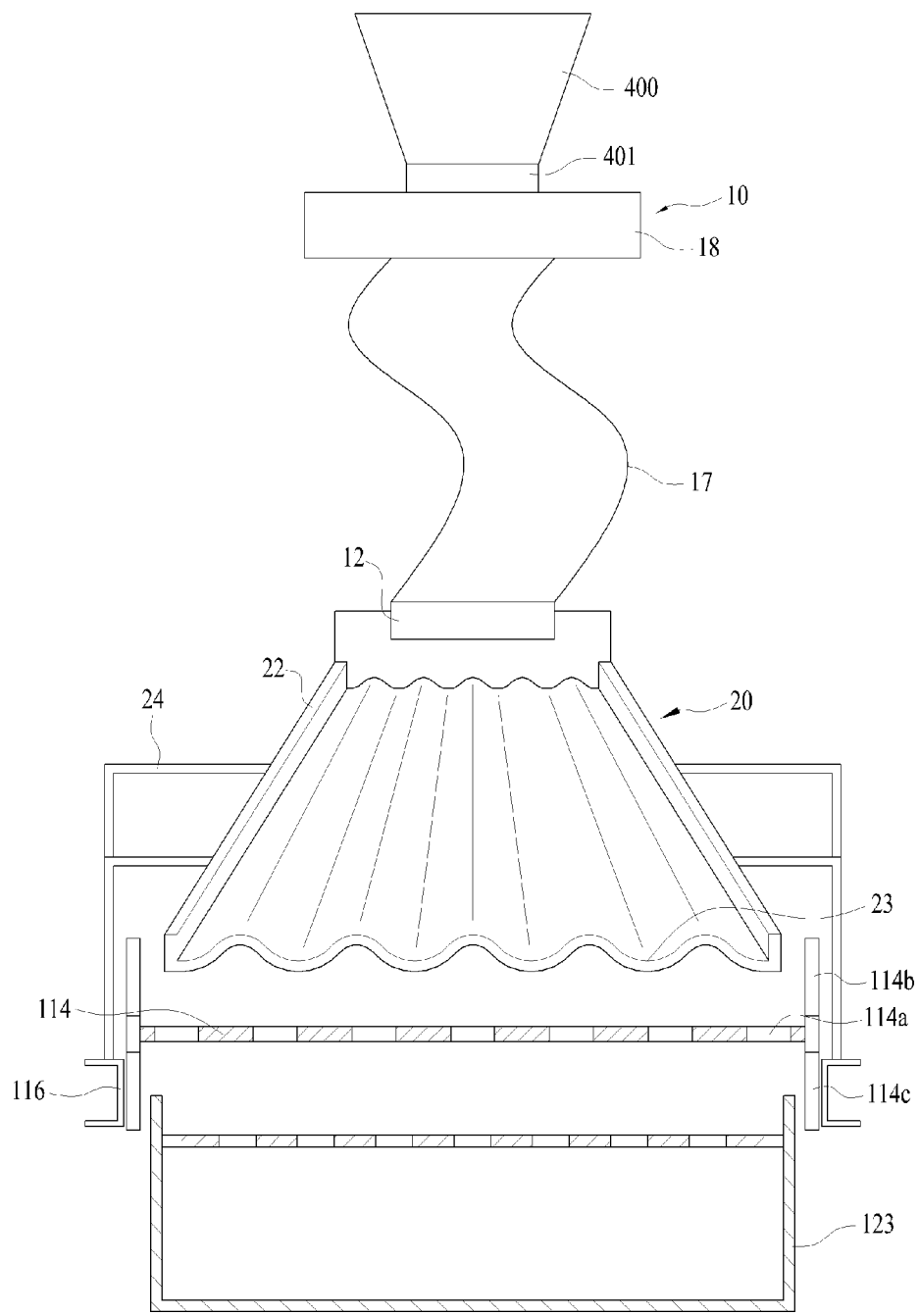
FIGS. 13 to 16 are plan views illustrating various modified examples of the dispersion feeder according to the present invention.

Further, in FIG. 13, the concave-convex 23 having the mountains and the valleys formed at the predetermined interval may be formed on the surface of the dispersion feeder 20. That is, the mountains and valleys having a predetermined height and depth are formed between the side plates 22 at the left and right sides of the dispersion feeder 20 at a predetermined cycle, and as a result, the coal pile C may be evenly dispersed. Further, the surface of the dispersion feeder 20 having the concave-convex 23 may have the arc shape.

In addition, in FIG. 14, the protrusions 22 are formed to protrude on the upper surface of the dispersion feeder 20, that is, the surface below the top other than a part just below the outlet pipe 12 of the dust reducer 10 at a predetermined interval. Moreover, the tops of the protrusions 22 have substantially the arc shape which is convex upward. This allows the coal to be dispersed between the protrusions 22 after being dropped to the dispersion feeder 20.

Figure 15:
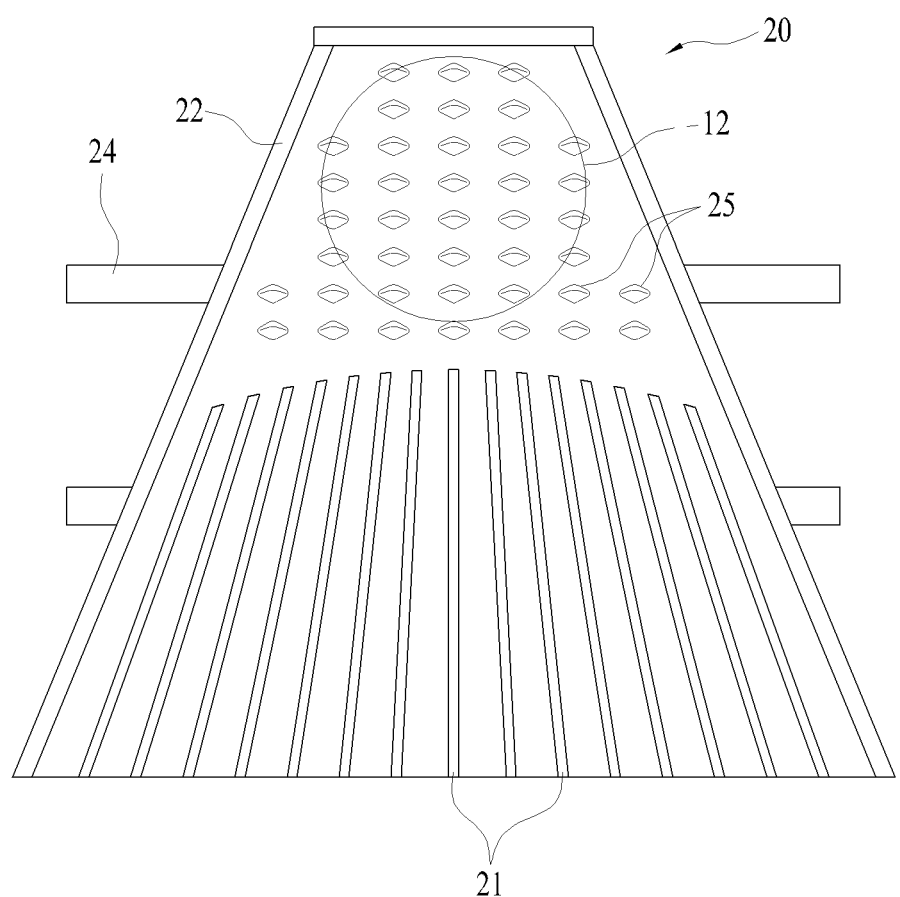

In addition, in FIG. 15, a plurality of embossings 25 are formed on the upper surface of the dispersion feeder 20, that is, the part just below the outlet pipe 12 of the dust reducer 10 and the protrusions 22 are formed on the surface below the op of the dispersion feeder 20 to protrude at a predetermined interval. Moreover, the tops of the protrusions 22 have substantially the arc shape which is convex upward. This allows the coal to be more dispersed by the embossings 25 and dispersed between the protrusions 22 after being dropped to the dispersion feeder 20.

Figure 16:
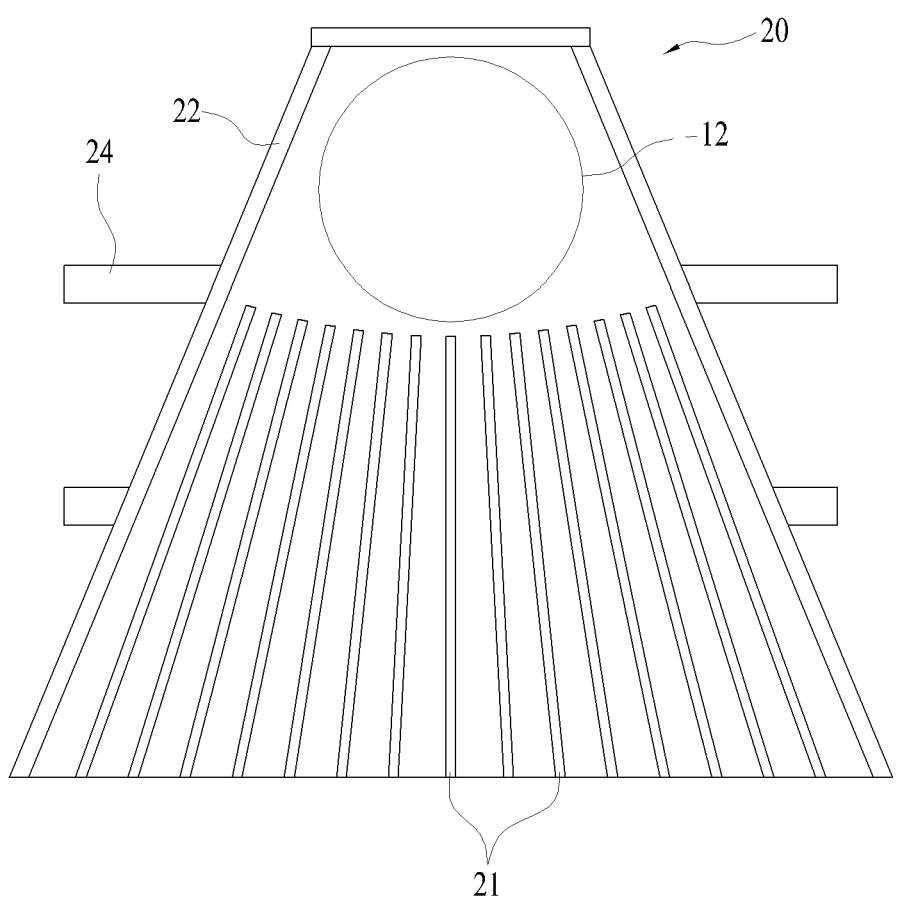
Figure 17:
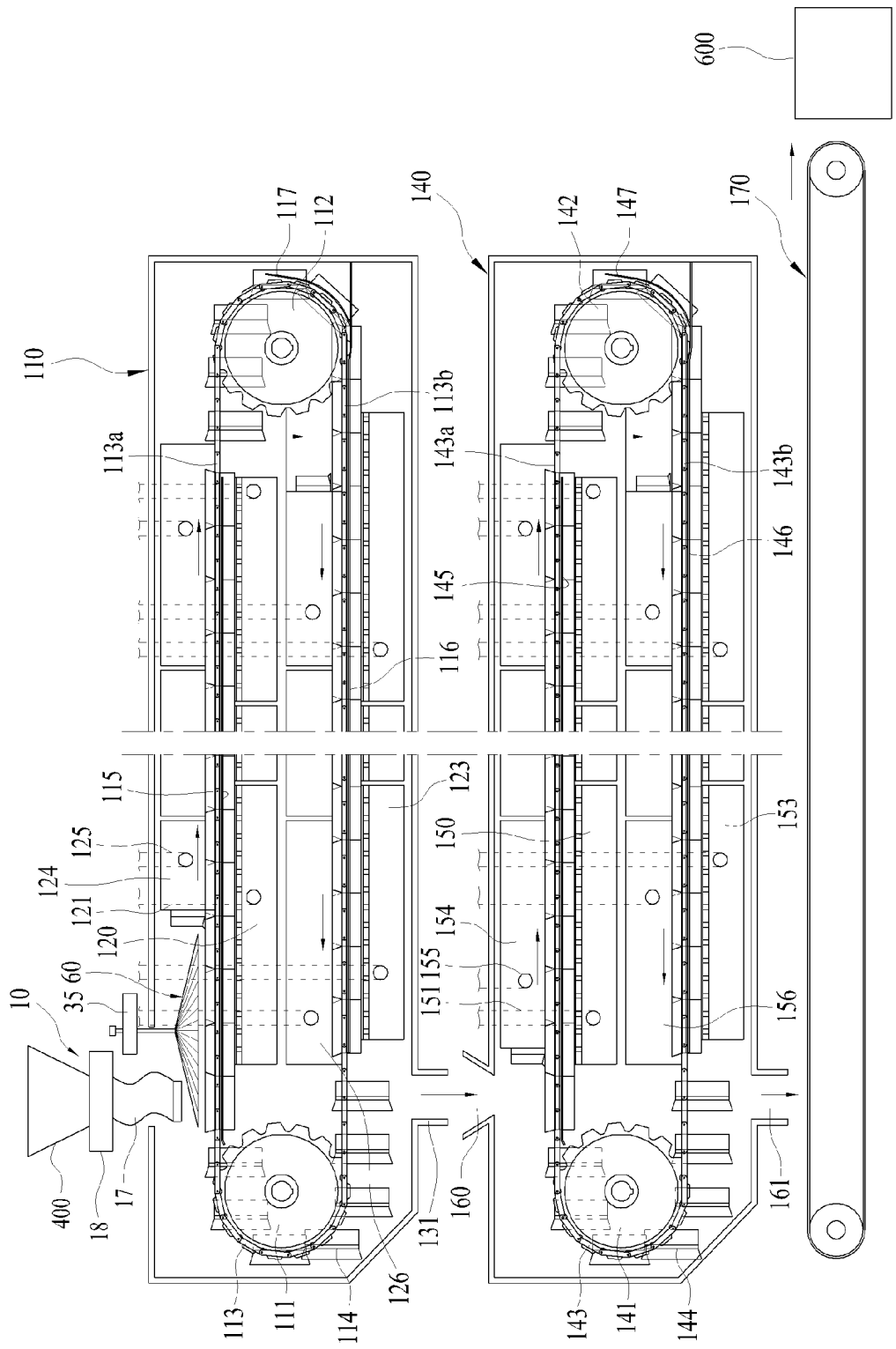
FIG. 17 is a configuration diagram illustrating a front side of the system for drying coal using reheat steam, as a third embodiment of the present invention.

In addition, in FIG. 16, the protrusions 22 are formed to protrude on the upper surface of the dispersion feeder 20, that is, the surface below the top other than a part just below the outlet pipe 12 of the dust reducer 10 at a predetermined interval. Moreover, the tops of the protrusions 22 have substantially the arc shape which is convex downward. This allows the coal to be dispersed between the protrusions 22 after being dropped to the dispersion feeder 20.

Next, a third embodiment of the apparatus for dust reduction and dispersion supply of input coal in a system for drying coal using reheat steam according to the present invention will be described with reference to FIGS. 17 to 24.

Figure 18:
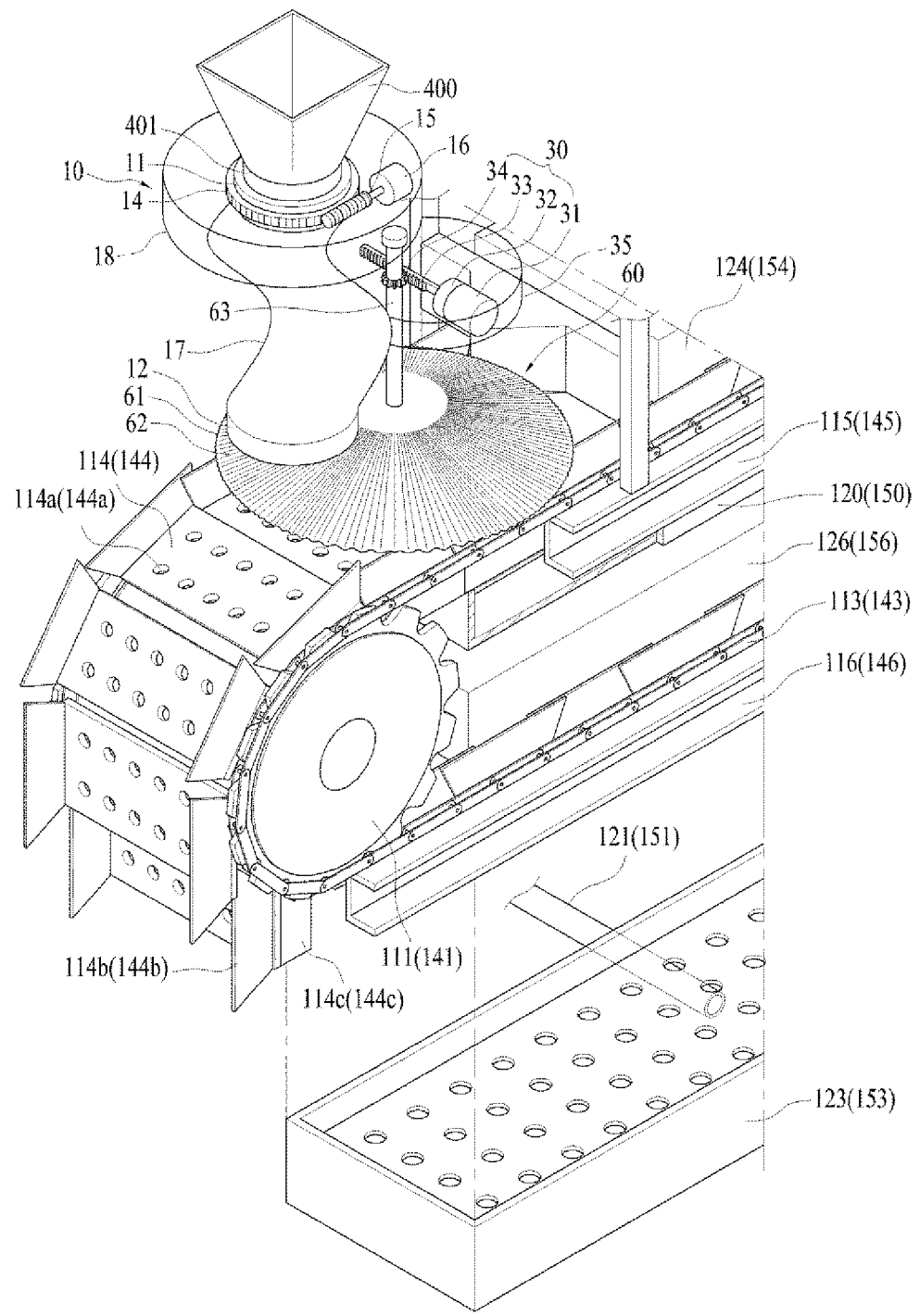
FIG. 18 is a perspective view illustrating a main part where an input coal dust reducer and a dispersion feeder are installed in the system for drying coal using reheat steam according to the present invention.

First, FIG. 18 illustrates an example in which the dust reducer 10 for reducing the dust of the coal and a dispersion feeder 60 are installed in the coal drying system 100.

Figure 19:
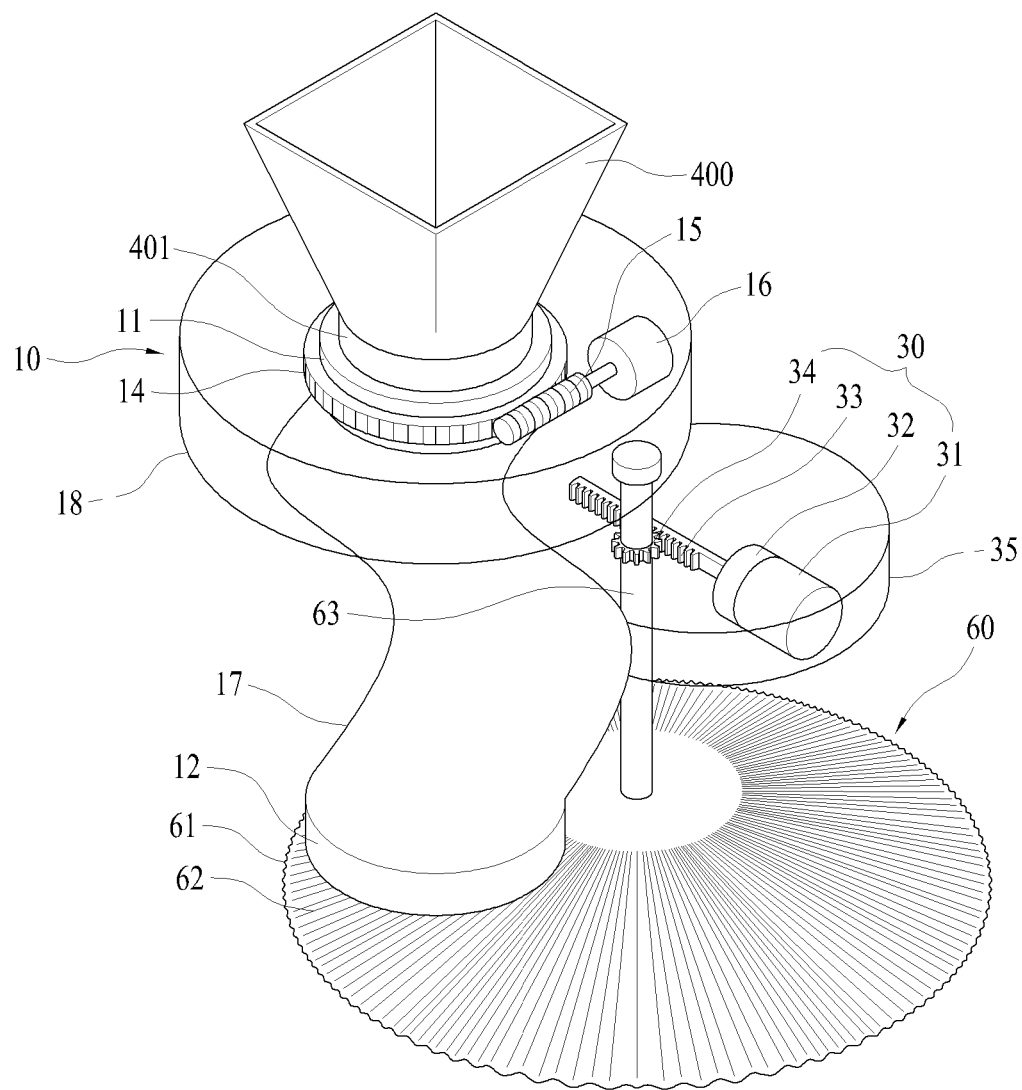
FIGS. 19 to 21 are perspective views illustrating various modified examples of the dust reducer and the dispersion feeder according to the third embodiment.

In FIG. 19, the dust reducer 10 is installed on the bottom of the coal constant feeder 400. The dust reducer 10 is installed to be spaced apart from the upward surfaces of the plurality of first transfer plates 114 of the first coal dryer 110 by a predetermined gap. Further, the dispersion feeder 60 is installed below the dust reducer 10 and on the side of the dust reducer 10. Accordingly, the coal supplied by the coal constant feeder 400 is dispersed by the dispersion feeder 60 with a predetermined amount after the dust is reduced by the dust reducer 60 which repeatedly rotates forward and backward to be supplied onto the upward surface of the first transfer plate 114.

Moreover, the inlet pipe 11 of the dust reducer 10 is coupled to the outlet 401 of the coal constant feeder 400 by the bearing. The worm wheel 14 is coupled on the outer periphery of the inlet pipe 11. The worm 15 is engaged in the gear formed on the outer periphery of the worm wheel 14. The worm 15 is gear-coupled with the worm wheel 14 and rotates at a predetermined velocity with the rotary force transferred from a motor 16. The worm wheel 14 is gear-coupled with the worm 15 at a predetermined gear ratio and the worm wheel 14 reduces the rotary velocity of the worm 15. The motor 16 which generates the rotary force in a predetermined direction may rotate forward or backward. The top of the curved pipe 17 is coupled to the inlet pipe 11. The curved pipe 17 has the shape in which the curved pipe 17 is bent in a predetermined direction. The pipe cross-section of the curved pipe 17 may have any one of the zigzag shape, the twist shape, and the spiral shape. The curved pipe 17 reduces the velocity at which the coal is supplied by changing the direction of the coal pile C supplied by the coal constant feeder 400. Moreover, the curved pipe 17 may be bent or twisted at least twice or more. The outlet pipe 12 is coupled to the end of the curved pipe 17. The outlet pipe 12 decides the direction in which the coal dummy C is input onto the first transfer plate 114. Further, the inlet pipe 11 and the outlet pipe 12 may be installed on substantially the same central axis.

In addition, a first case 18 may be installed to seal the worm wheel 14, the worm 15, and the motor 16 installed on the outer peripheral of the inlet pipe 11 of the dust reducer 10. This is to prevent loss or malfunction of the worm wheel 14, the worm 15, and the motor 16 by the dust which may be generated when the coal pile C is supplied onto the surface of the first transfer plate 114. Further, the first case 18 may be preferably configured to seal all portions other than the outlet pipe 12 of the dust reducer 10.

Moreover, the dust reducer 10 decreases the velocity at which the coal is dropped onto the upward surface of the first transfer plate 114 by rotating a predetermined amount of coal supplied by the coal constant feeder 400 to suppress the generation of the dust.

Further, the dispersion feeder 60 is installed on one side of the dust reducer 10 and below the dust reducer 10. In the dispersion feeder 60, a conical dispersion disk 61 is installed to be spaced apart from the outlet pipe 12 of the dust reducer 10 at a predetermined distance below the outlet pipe 12. A rotary shaft 63 is coupled to the top of the center of the dispersion disk 61. The concave-convex 62 may be formed on the surface of the dispersion disk 61 with the mountains and valleys formed radially around the rotary shaft 63 at a predetermined interval. The concave-convex 62 allows the coal dropped and input onto the surface of the dispersion disk 61 while the dispersion disk 61 rotates at a predetermined angle to be easily dispersed in a predetermined direction. The bottom of the dispersion feeder 20 may be installed to be close to the surface of the first transfer plate 114. In this case, when the coal pile C supplied to the first transfer plate 114 is supplied between the bottom of the dispersion feeder 60 and the top of the first transfer plate 114, the supply of the coal pile C may not be interfered by the dispersion feeder 60.

A power generator 30 generating predetermined motion power is provided in the dispersion feeder 60. The power generator 30 includes a forward/backward motor 31 generating predetermined forward rotary power and reverse rotary power, a conversion gear box 32 decelerating the rotary power output from the forward/reverse motor and converting a rotary motion into a linear reciprocating motion, a rack gear 33 axially coupled to the conversion gear box, and a pinion gear 34 coupled to the rotary shaft 63 and engaged with the rack gear 33. Accordingly, the conversion gear box 32 converts periodic forward/backward rotation of the forward/backward motor 31 into the linear reciprocating motion and transfers the linear reciprocating motion to the rack 33 and the rack 33 rotates the engaged pinion gear 34 forward and backward to allow the dispersion disk 61 to rotate forward and backward at a predetermined angle with the forward/backward rotation of the rotary shaft 63.

Figure 20:
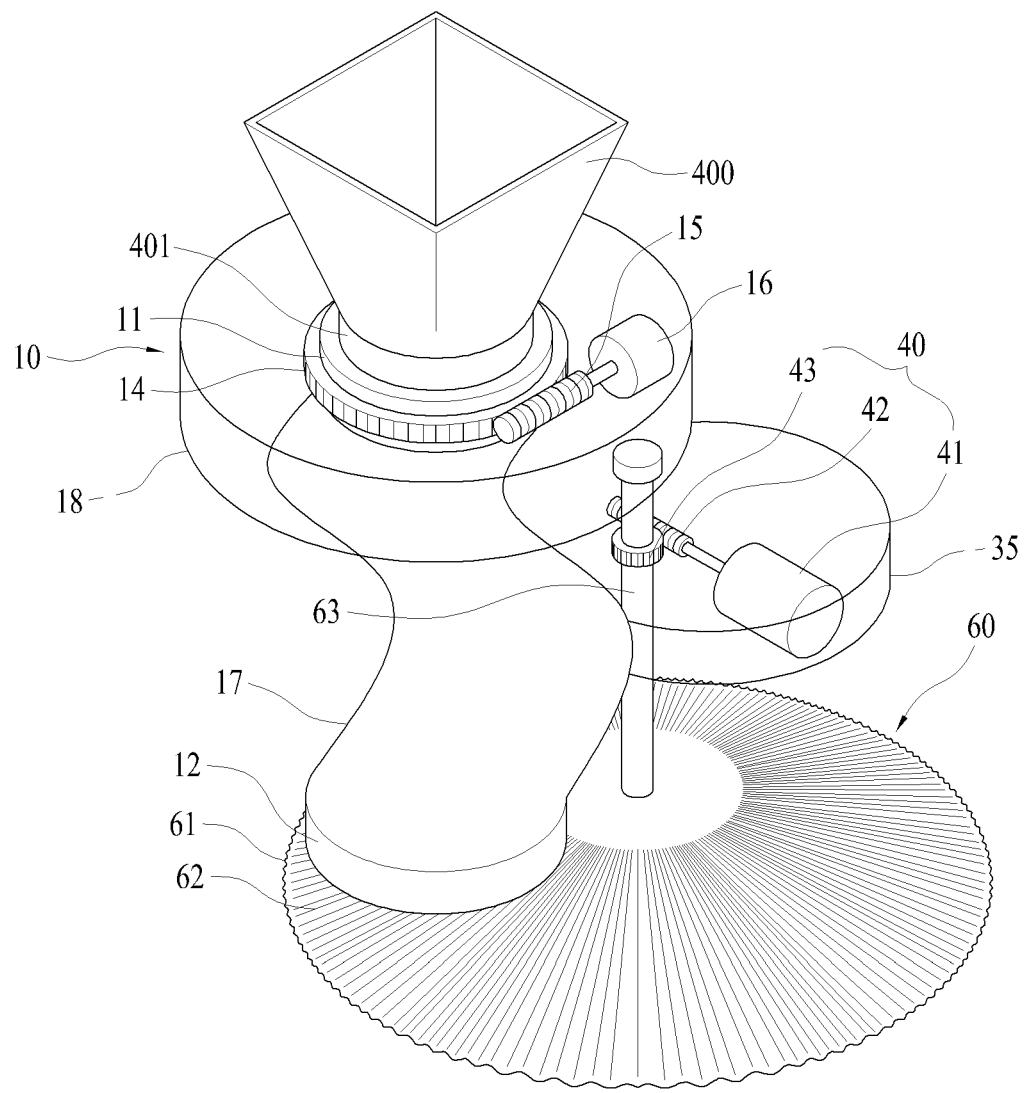

Meanwhile, as another modified example of the power generator according to the present invention, in FIG. 20, a power generator 40 may include a forward/backward motor 41 generating predetermined forward rotary power and backward rotary power, a worm 42 axially coupled to the forward/backward motor, and a worm wheel 43 coupled to the rotary shaft 63 and engaged with the worm.

Figure 21:
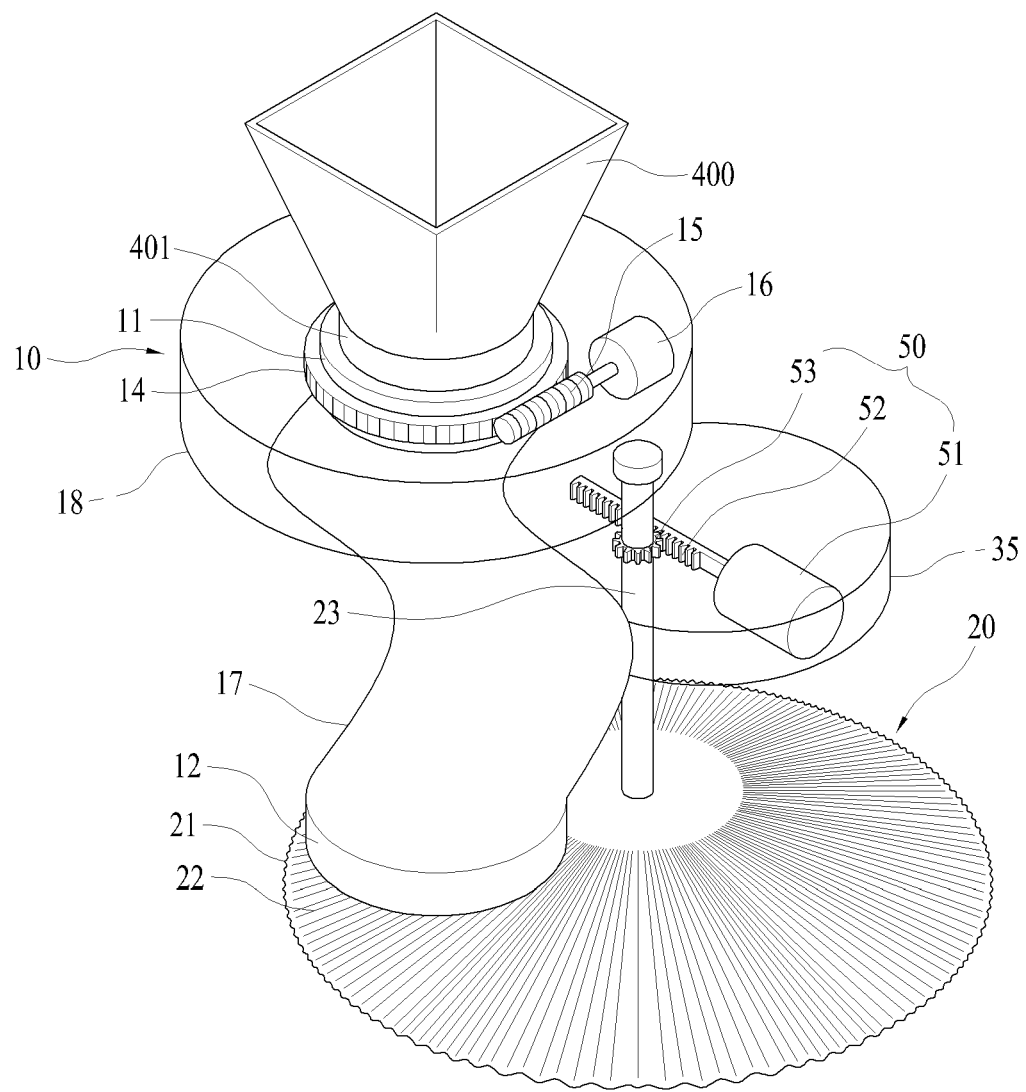

Meanwhile, as yet another modified example of the power generator according to the present invention, in FIG. 21, a power generator 50 may include an actuator 51 generating the linear reciprocating motion, a worm 52 axially coupled to the actuator, and a worm wheel 53 coupled to the rotary shaft 63 and engaged with the worm 53.

Accordingly, the power generators 30, 40, and 50 may include even configurations of various modified examples which may rotate the dispersion disk 61 forward/backward at a predetermined angle by rotating the rotary shaft 63 forward/backward, respectively.

Further, the power generator 30 including the forward/backward motor 31, the conversion gear box 32, the rack gear 33, and the pinion gear 34 may be installed in a second case 35. The second case 35 may prevent the malfunction of the power generator 30 caused by the dust which may be scattered from the coal pile C discharged from the outlet pipe 12 of the dust reducer 10 and input onto the surface of the dispersion disk 61.

Figure 22:
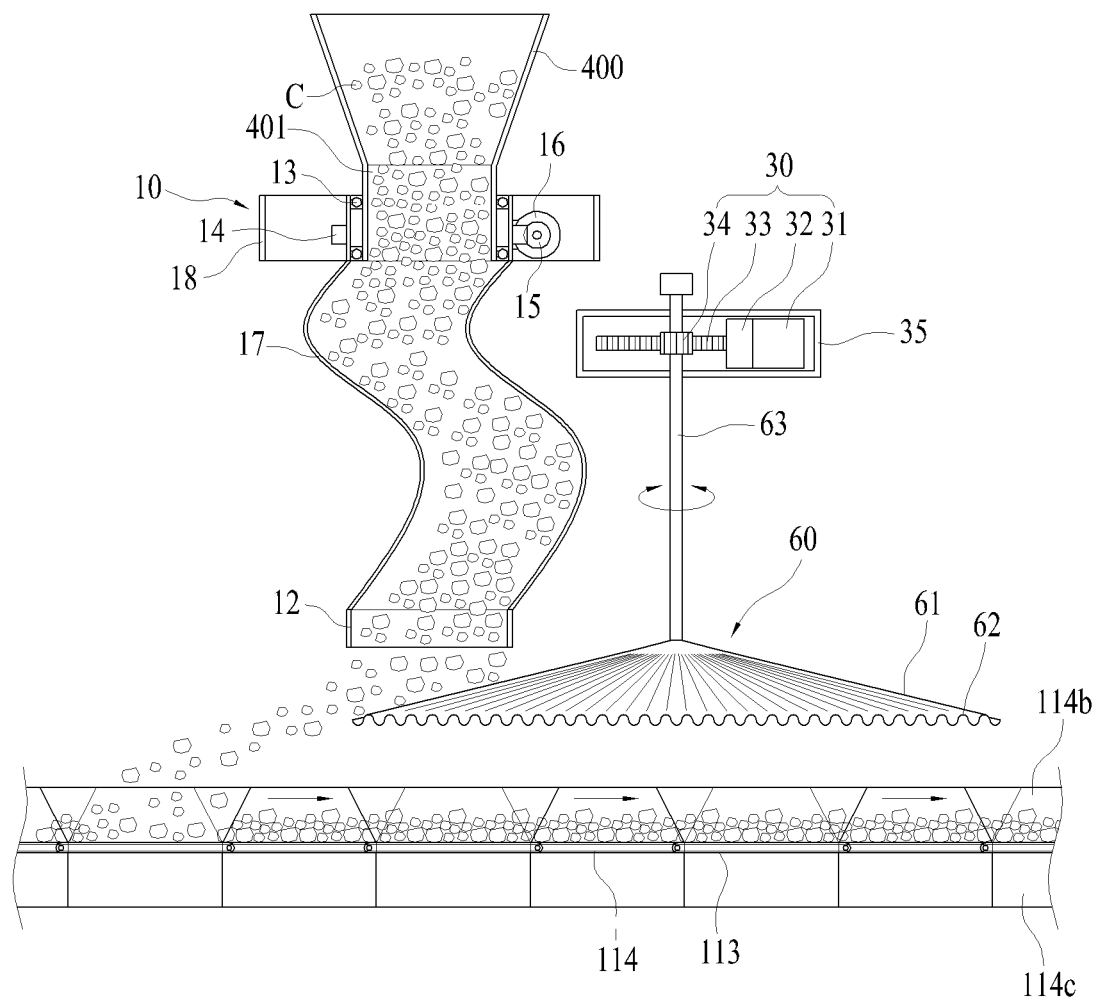
FIGS. 22 and 23 are cross-sectional views illustrating operations of the dust reducer and the dispersion feeder according to the present invention.

In the apparatus for dispersion supply and dust reduction of input coal in the system for drying coal according to the present invention, which is configured as such, in FIG. 22, the coal pile C is vertically dropped through the outlet 401 of the coal constant feeder 400 by the gravity. In this case, while the coal pile C passes through the curved shape 17 of the dust reducer 10, the input velocity of the coal pile C is reduced. That is, the coal pile C input through the outlet 401 is supplied in a left direction while contacting a pipe which protrudes from the right side to the left side in the curved pipe 17 and supplied in a right direction while contacting a pipe which protrudes fro the left side to the right side in the curved pipe 17 again and thereafter, supplied onto the first transfer plate 114 through the outlet pipe 12. The coal pile C is supplied through the outlet pipe 12 after the velocity of the coal pile C is reduced while changing the direction several times according to the number of bending or twisting times of the curved pipe 17.

Further, in the dust reducer 10, the worm wheel 14 rotates by the rotary force of the worm 15 coupled to a rotary shaft of the motor 16, and as a result, the inlet pipe 11 on which the worm wheel 14 rotates. The rotation of the inlet pipe 11 rotates the curved pipe 17 and the outlet pipe 12. The supply of the coal pile C which is further reduced by an influence by the bent or twisted curved pipe 17 and the rotary force of the curved pipe 17 passing through the dust reducer 10 is provided, and as a result, the velocity of the coal pile C supplied onto the surface of the first transfer plate 114 is finally reduced to minimize the generation of the dust.

Further, the dispersion feeder 60 rotates the dispersion disk 61 coupled to the rotary shaft 63 forward/backward with the power generated by the power generator 30 to evenly disperse the coal pile C dropped by the dust reducer 10 onto the surface of the first transfer plate 114. That is, the rotary motion b the forward/backward rotary power of the forward/backward motor 31 is converted into the linear reciprocating motion through the conversion gear box 32 and the rack gear 33 by the converted linear reciprocating motion rotates the engaged pinion gear 34 forward/backward to rotate the dispersion disk 61 coupled to the rotary shaft 63 at a predetermined angle.

Figure 24:
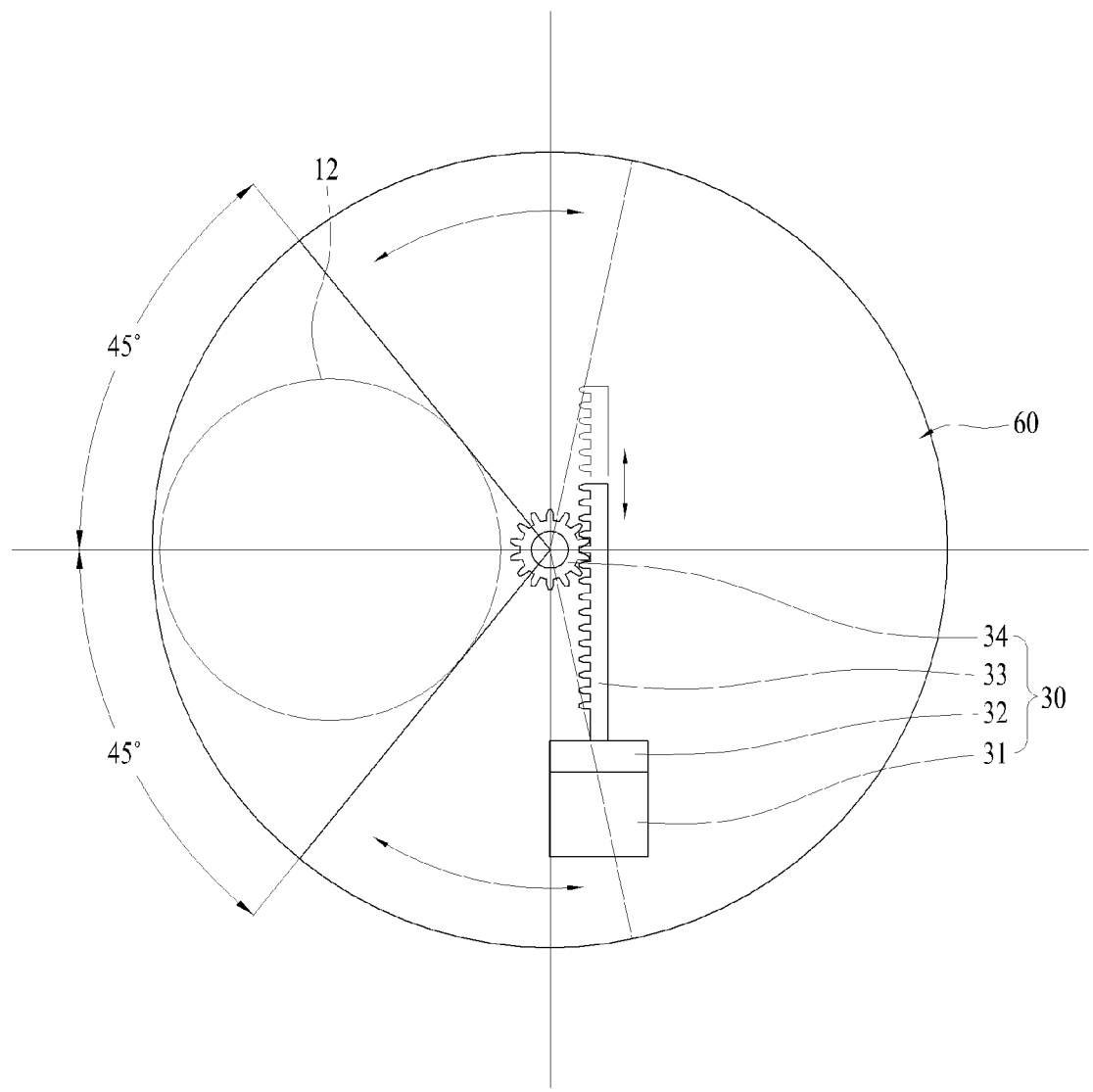
FIG. 24 is a plan view illustrating a dispersion plate operating angle of the dispersion feeder for coal input from the dispersion reducer according to the present invention.
Figure 25:
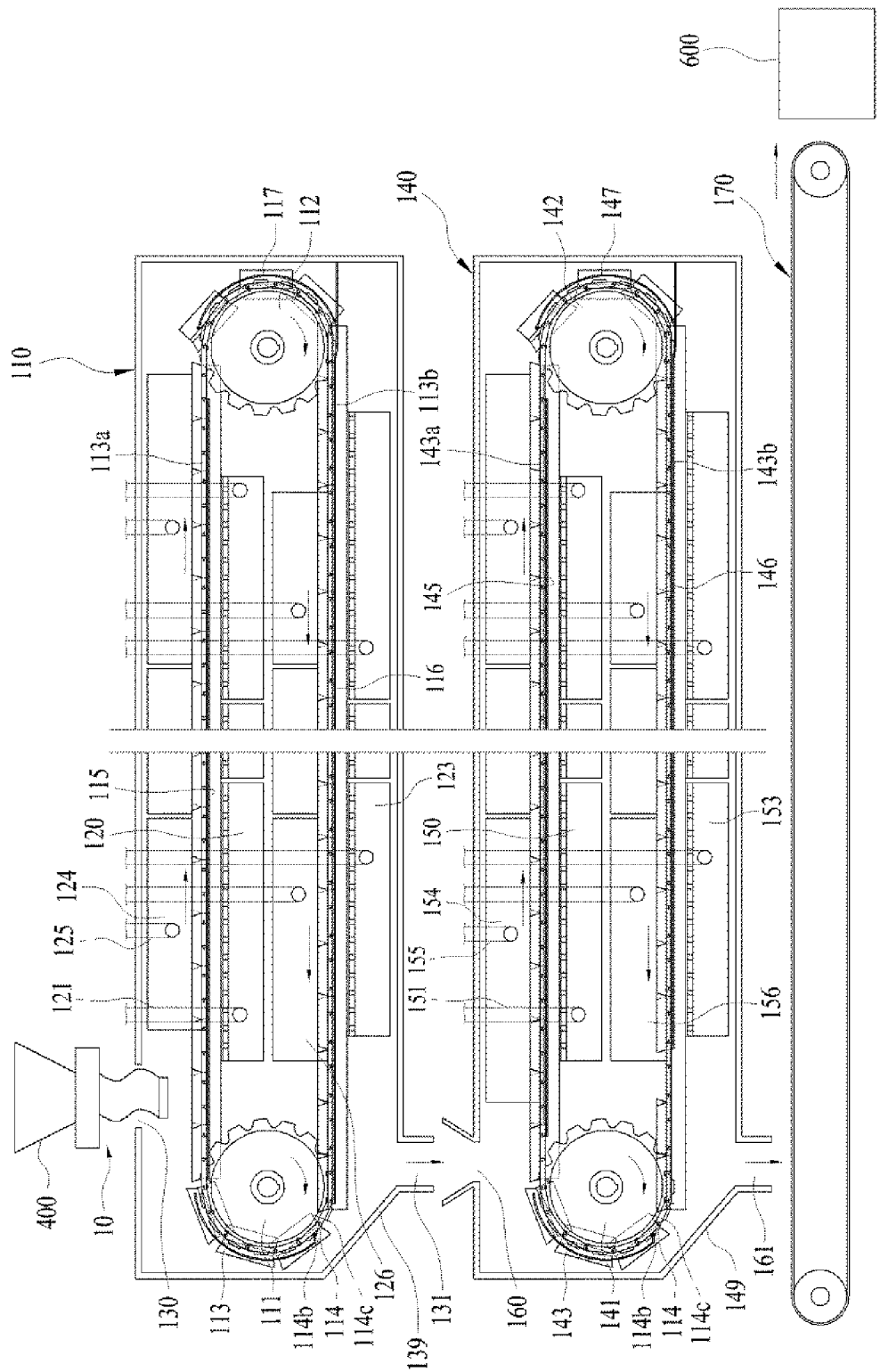
FIG. 25 is a configuration diagram illustrating a front side of the system for drying coal using reheat steam, as a fourth embodiment of the present invention.

In this case, an angle at which the dispersion disk 61 rotates forward/backward may deviate horizontally from the center approximately at 45 degrees or more in FIG. 24. Accordingly, a rotational angle of the forward/backward motor 31 or a length or the rotational angle depending on the engagement of the rack gear 33 or the pinion gear 34 need to be adjusted. In addition, the rotary velocities for the forward rotation and the backward rotation of the forward/backward motor 31 need to be constantly adjusted.

Further, the concave-convex 62 is formed on the surface of the dispersion disk 61 to evenly disperse the coal pile C discharged from the outlet pipe 12 of the dust reducer 10 onto the surface of the first transfer plate 114 and further, the coal pipe C which deviates from the surface of the first transfer plate 114 may pop out by the guards 114b coupled to the first chains 113. Accordingly, the bottom edge of the dispersion disk 61 is positioned to be spaced apart from the surface of the first transfer plate 114 and may be positioned between the guards 144b coupled to the first chains 113 and positioned to be lower than the top of the guard 114b. In this case, the coal pile C carries the guard 114b to prevent the coal from being scattered.

Accordingly, according to the present invention, the dust which may be generated by the coal pile C directly input onto the surface of the first transfer plate 114 from the dust reducer 10 may be further reduced by the dispersion disk 61 in the dispersion feeder 60 and the coal pile C may be evenly dispersed on the first transfer plate 114 by the forward/backward rotation of the dispersion disk 61.

Figure 23:
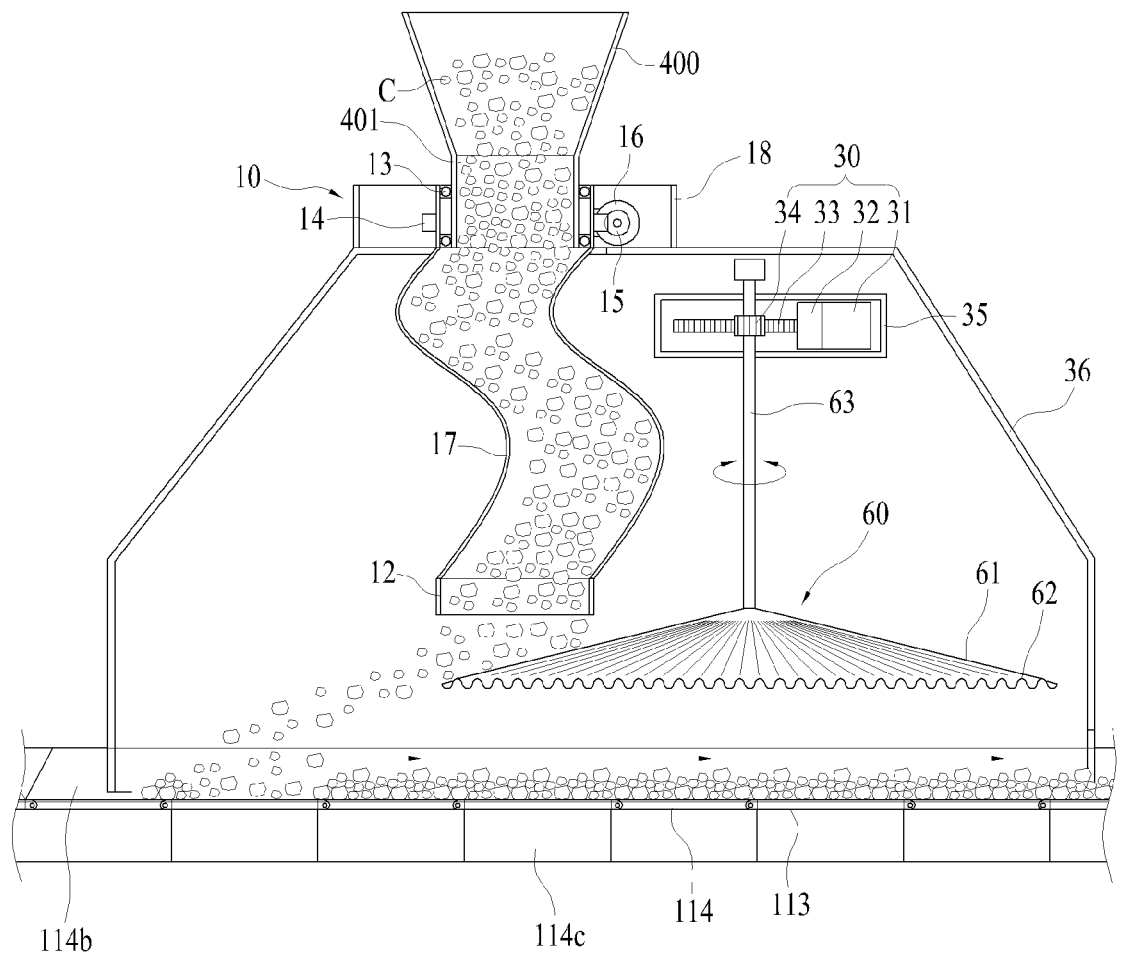

Further, in FIG. 23, a cover 36 may be installed, which is used for preventing the coal dust from being scattered from the bottom of the first case 18 to the external side including the curved pipe 17 and the dispersion feeder 60. By the cover 36, the dust scattered from the coal pile C input onto the surface of the first transfer plate 114 may be prevented and noise may be reduced, which is generated by actuation of the dust reducer 10 and the dispersion feeder 60.

Meanwhile, a fourth embodiment of the apparatus for dust reduction and dispersion supply of input coal in a system for drying coal using reheat steam according to the present invention will be described with reference to FIGS. 25 to 30. The fourth embodiment includes a configuration and a structure that drops and supplies the coal pile transferred on the transfer plate to the transfer plate of the lower dryer in the multi-stage dryer in addition to the configuration and the structure of the transfer plate.

Figure 26:
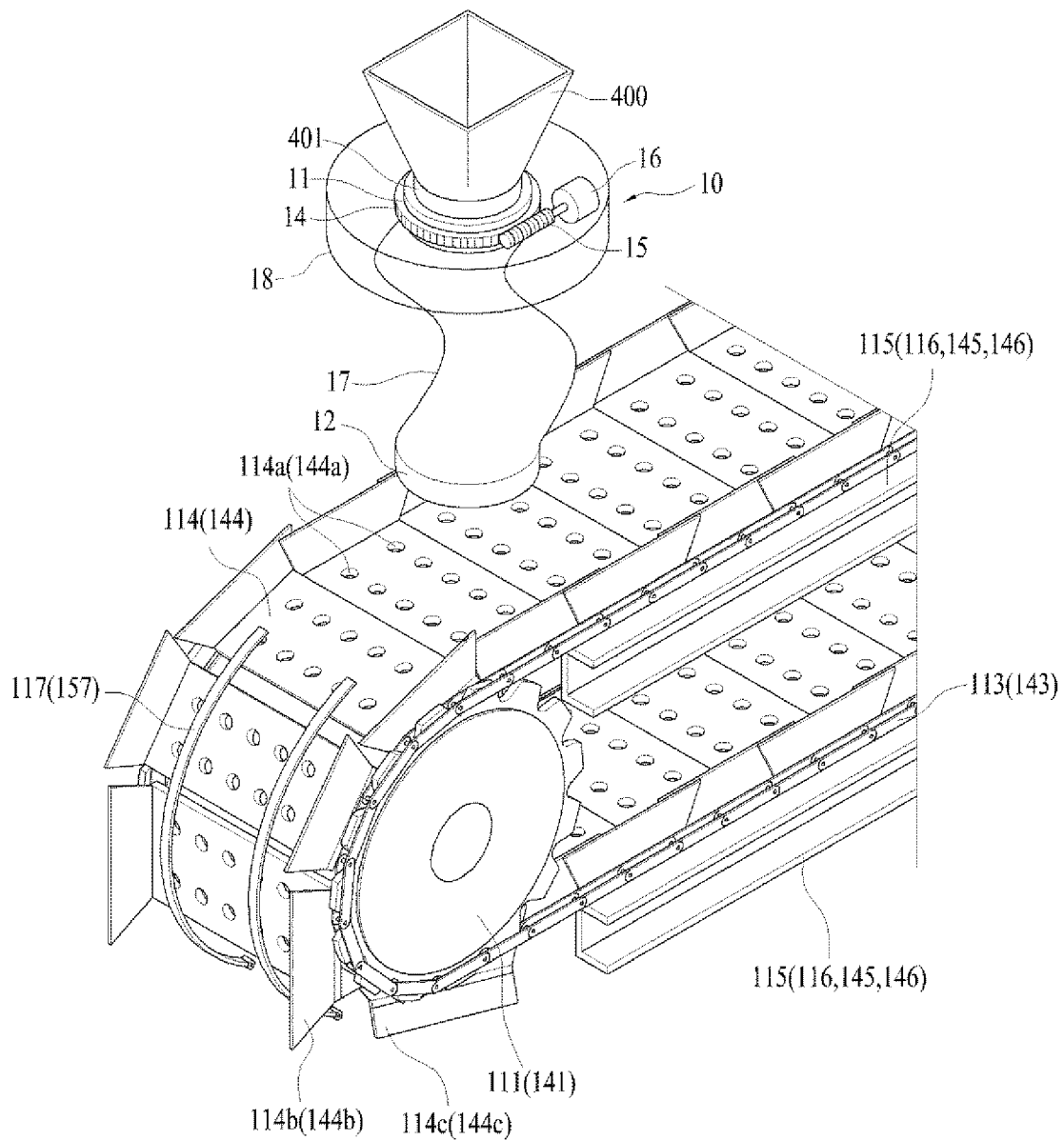
FIG. 26 is a perspective view illustrating a main part where the dust reducer is installed in the system for drying coal using reheat steam according to the present invention.
Figure 27:
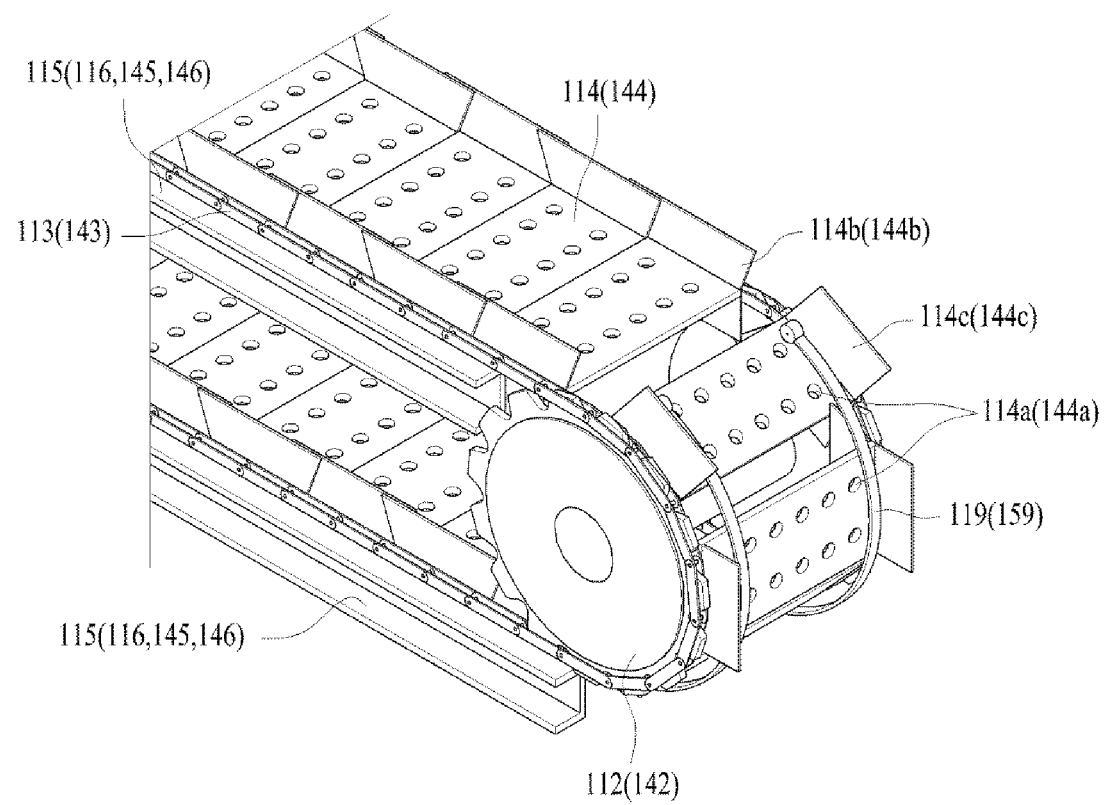
FIG. 27 is a perspective view illustrating a main part of a transfer device in the system for drying coal using reheat steam according to the present invention.

FIGS. 26 and 27 illustrate an example in which the dust reducer 10 for reducing the dust of the coal input in a coal transfer device of the coal drying system 100 is installed.

Figure 28:
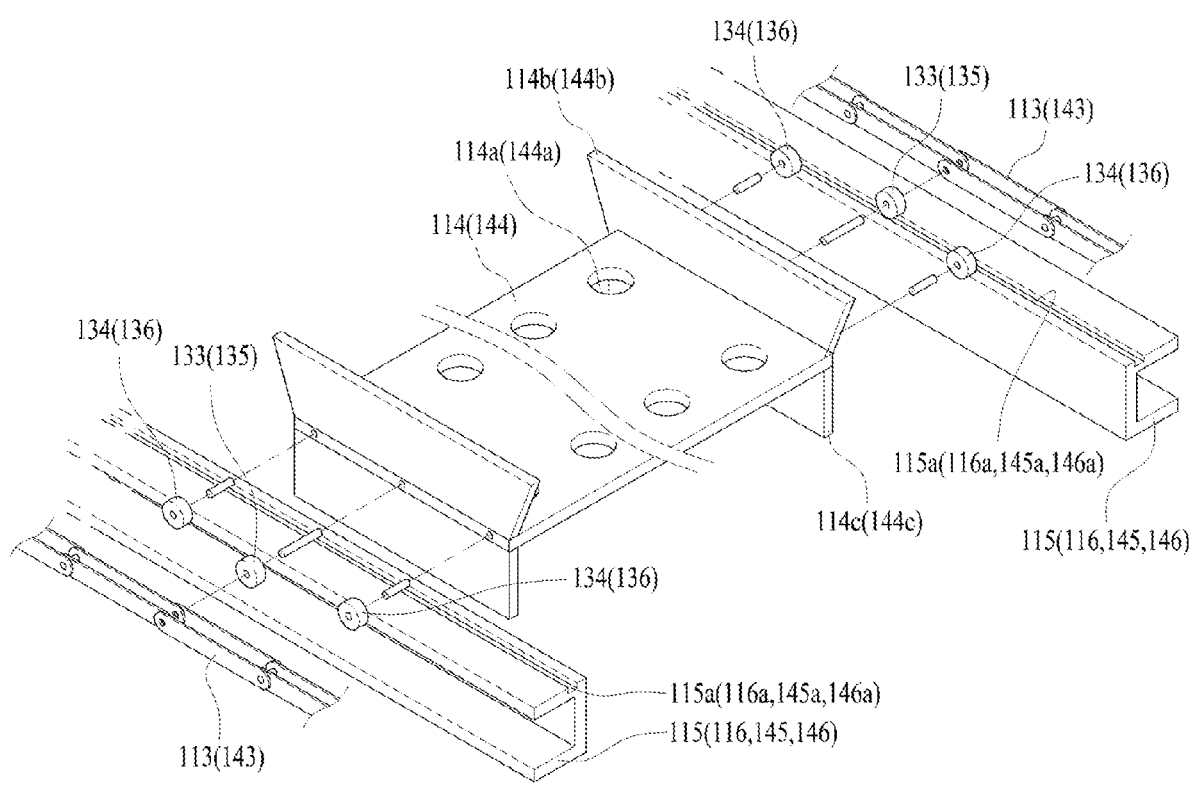
FIG. 28 is an exploded perspective view illustrating the main part of the transfer device in the system for drying coal using reheat steam according to the present invention.

In FIG. 28, a first transfer roller 133 is hinge-coupled between two-side centers of the first transfer plate 114 and the first chains 113, respectively. That is, the first transfer roller 133 is hinge-coupled between the lateral center of the first transfer plate 114 and the first chain 113. In addition, at left and right sides of the first transfer roller 133, first auxiliary rollers 134 are hinge-coupled with the sides of the first transfer plate 114, respectively. The first auxiliary rollers 134 are hinge-coupled with the sides of the second transfer plate 114, that is, the left side and the right side, respectively.

Moreover, a groove 115a and a groove 116a guiding rotation of the first transfer roller 133 and the first auxiliary roller 134 are formed on the surfaces of the first guide rail 115 and the second guide rail 116, respectively. Accordingly, in the first transfer plate 114, the first transfer roller 133 and the first auxiliary roller 134 hinge-coupled with each other are transferred along the groove 115a formed on the surface of the first guide rail 115 and the groove 116a formed on the surface of the second guide rail 116.

Figure 29:
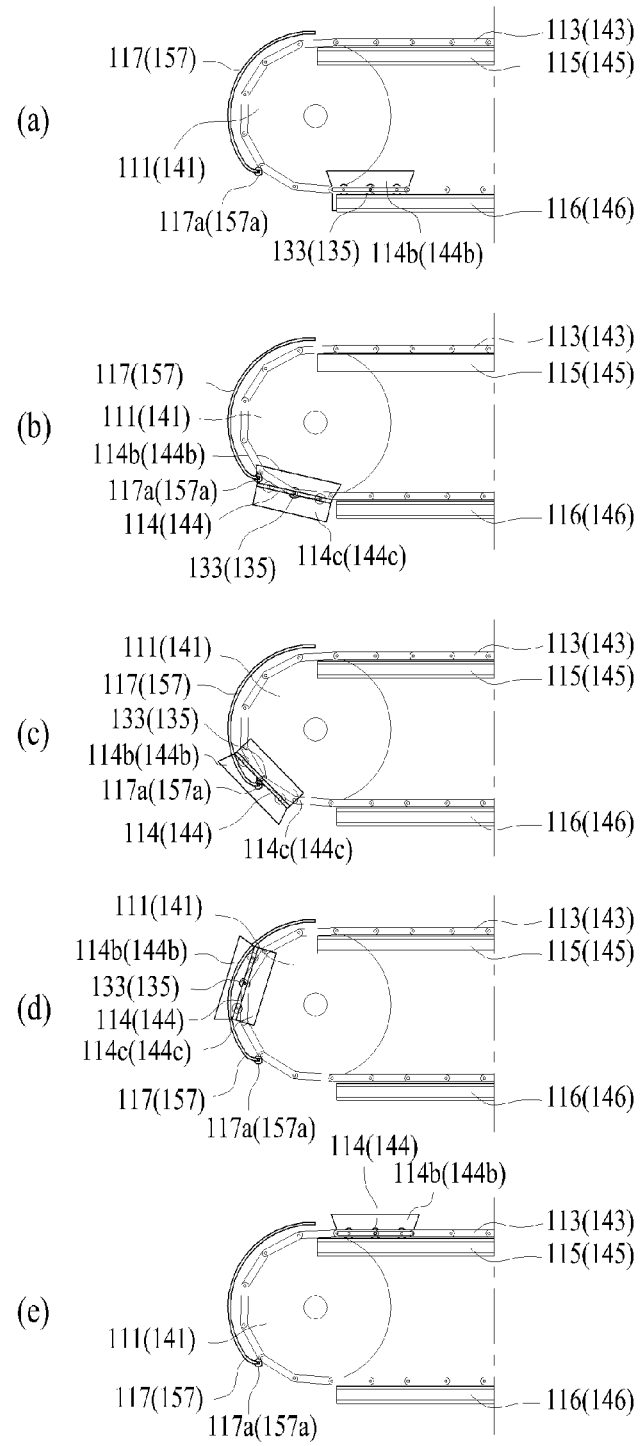
FIGS. 29 and 30 are cross-sectional views illustrating the operation of the transfer device in the system for drying coal using reheat steam according to the present invention.
Figure 30:
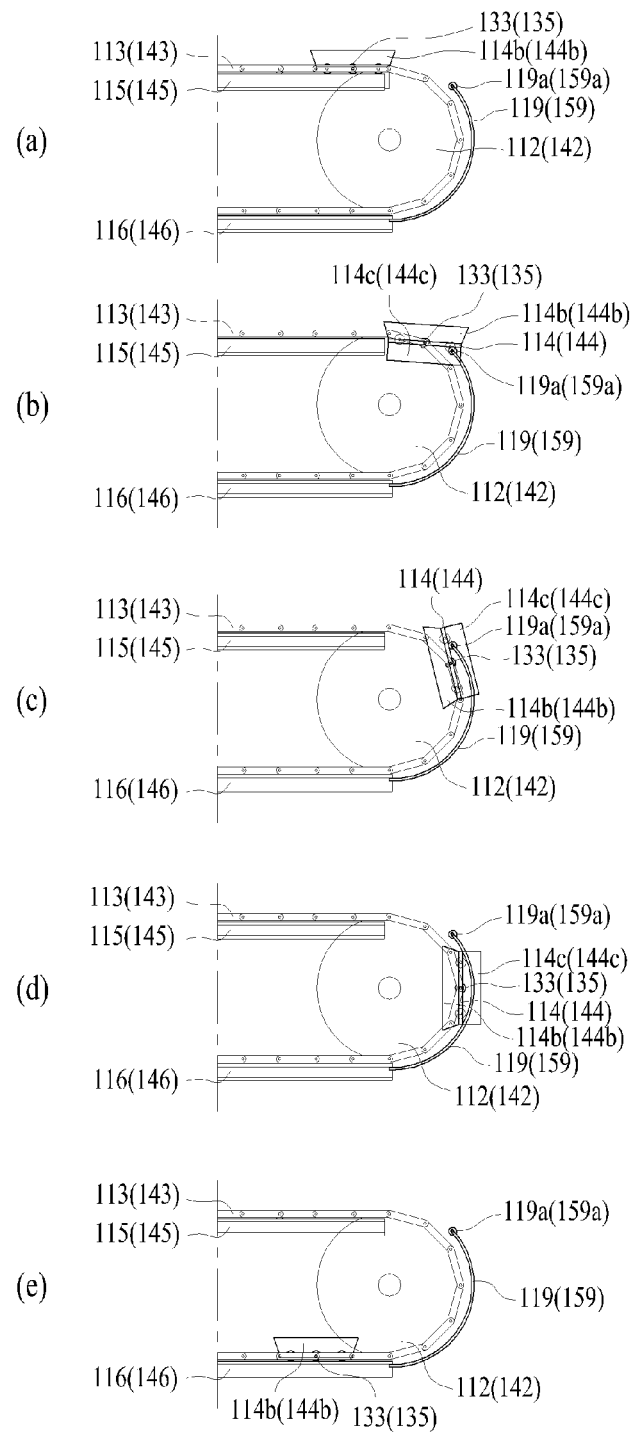

In FIGS. 29 and 30, a first guide bar 117 rotating and up-supporting the lower first transfer plate 114 separated from the second guide rail 116 in one direction is installed from the top to the bottom of the first drive sprocket 111 along the side. A first trigger 117a is coupled to the end of a first guide bar 117 and the first trigger 117a is constituted by an axial rotating roller. The first trigger 117a is installed at a position which is in contact with one side of the bottom of the upper second transfer plate 114.

Further, a second guide bar 119 rotating and down-supporting the upper first transfer plate 114 separated from the first guide rail 114 is installed from the bottom to the top of the first driven sprocket 112 along the side. A second trigger 119a is coupled to the end of the second guide bar 119 and the second trigger 119a is constituted by the axial rotating roller. The second trigger 119a is installed at a position which is in contact with one side of a plane of the lower first transfer plate 114.

In addition, in the second coal dryer 140, a pair of second drive sprockets 141 and a pair of second driven sprockets 142 are spaced apart from each other at a predetermined distance to be fastened to second chains 143, respectively, a plurality of transfer plates 144 is hinge-coupled between the second chains 143, a pair of second guide rails 145 horizontally supporting the second transfer plate 144 is installed below an upper second chain 143a connected between the second drive sprocket 141 and the second driven sprocket 142, a pair of second guide rails 146 horizontally supporting the second transfer plate 144 is installed below a lower second chain 143b connected between the second drive sprocket 141 and the second driven sprocket 143, a third steam chamber 150 injecting reheat steam supplied from the reheater 500 is installed below the upper second chain 143a, a fourth steam chamber 153 injecting reheat steam supplied from the reheater 500 is installed below the lower second chain 143b, a third exhaust gas chamber 154 collecting exhaust gas is installed on the upper second chain 143a, and a fourth exhaust gas chamber 156 collecting exhaust gas is installed on the lower second chain 143b.

Further, in FIG. 28, the first transfer rollers 135 are hinge-coupled between both centers of the second transfer plate 144 and the second chains 113, respectively. That is, the second transfer roller 135 is hinge-coupled between the lateral center of the second transfer plate 144 and the second chain 143. In addition, at left and right sides of the second transfer roller 135, second auxiliary rollers 136 are hinge-coupled with the sides of the second transfer plate 144, respectively. The second auxiliary rollers 136 are hinge-coupled with the sides, that is, the left side and the right side of the second transfer plate 144.

Further, a groove 145a and a groove 146a guiding rotation of the second transfer roller 135 and the second auxiliary roller 136 are formed on the surfaces of the third guide rail 145 and the fourth guide rail 146, respectively. Accordingly, the second transfer roller 135 and the second auxiliary roller 136 hinge-coupled with the second transfer plate 144 is transferred along the groove 145a formed on the surface of the third guide rail 145 and the groove 146a formed on the surface of the fourth guide rail 146.

In FIGS. 29 and 30, a third guide bar 157 rotating and up-supporting the lower second transfer plate 144 separated from the fourth guide rail 146 in one direction is installed from the top to the bottom of the second drive sprocket 141 along the side. A third trigger 157a is coupled to the end of the third guide bar 157 and the third trigger 157a is constituted by the axial rotating roller. The third trigger 157a is installed at a position which is in contact with one side of the bottom of the upper second transfer plate 144.

Further, a fourth guide bar 159 rotating and down-supporting the upper second transfer plate 144 separated from the third guide rail 145 is installed from the bottom to the top of the second driven sprocket 142 along the side. A fourth trigger 159a is coupled to the end of a fourth guide bar 159 and the fourth trigger 159a is constituted by the axial rotating roller. The fourth trigger 159a is installed at a position which is in contact with one side of the plane of the lower second transfer plate 144.

In addition, in the first transfer plate 114, a plurality of through-holes 114a is formed so that the reheat steam injected from the first steam chamber 120 and the second steam chamber 123 passes through the first transfer plate 114 to contact the coal particles. At upper left and right sides of the first transfer plate 114, a guard 114b having a predetermined height is installed to prevent the input coal pile from flowing in a left or right direction of the first transfer plate 114. The guard 114b has a shape that is wide at the top and narrow at the bottom as a substantially trapezoidal shape. Accordingly, the top of the guard 114b of the first transfer plate 114 is overlapped with an adjacent guard 114b. In this case, the guard 114b of the first transfer plate 114 is installed in a substantially zigzag direction with the adjacent guard 114b. Further, at lower left and right sides of the first transfer plate 114, shield plates 114c are installed to prevent the reheat steam injected from the first steam chamber 120 and the second steam chamber 123 from being lost when injected to left and right sides of each of the first steam chamber 120 and the second steam chamber 123.

In addition, in the second transfer plate 144, a plurality of through-holes 144a is formed so that the reheat steam injected from the third steam chamber 150 and the fourth steam chamber 153 passes through the second transfer plate 144 to contact coal particles. At upper left and right sides of the second transfer plate 144, guards 144b having a predetermined height are installed to prevent the input coal pile from flowing in a left or right direction of the second transfer plate 144. The guard 144b has a shape that is narrow at the top and widened at the bottom as the substantially trapezoidal shape. Accordingly, the top of the guard 144b of the second transfer plate 144 is overlapped with an adjacent guard 144b. In this case, the guard 144b of the second transfer plate 144 may be installed in the substantially zigzag direction with the adjacent guard 144b. Further, at lower left and right sides of the second transfer plate 144, shield plates 144c are installed to prevent the reheat steam injected from the third steam chamber 150 and the fourth steam chamber 153 from being lost when injected to left and right sides of each of the third steam chamber 150 and the fourth steam chamber 153.

In addition, in FIG. 30a, the upper first transfer plate 114 is transferred to the end of the first guide rail 115 by rotating the first driven sprocket 112. In FIG. 30b, while the left bottom of the upper first transfer plate 114 deviates from the end of the first guide rail 115, the right bottom of the upper first transfer plate 114 is in contact with the second trigger 119a of the second guide bar 119. In this case, in the upper first chain 113, the upper first transfer plate 114 hinge-coupled to the first transfer roller 133 is separated from the first guide rail 115 and simultaneously rotates in a left direction of the first transfer roller 133 as an axis to drop down the loaded coal pile. In addition, in FIG. 30c, the bottom of the upper first transfer plate 114 moves downward along the second trigger 119a. In FIG. 30d, the upper first transfer plate 114 is maintained in a substantially vertical state and moves without pivoting along a rotation radius of the first drive sprocket 112 while the bottom contacts the second guide bar 119. In FIG. 30e, while the upper first transfer plate 114 transferred downward moves up to the second guide rail 116, the coal pile dropped from the first transfer plate along the lower first transfer plate 114 is loaded and transferred. In addition, the coal pile loaded on the lower first transfer plate 114 is transferred and dried by the reheat steam.

Next, in FIG. 29a, the lower first transfer plate 114 is transferred to the end of the second guide rail 116 by rotating the first drive sprocket 111. In FIG. 29b, while the right bottom of the lower first transfer plate 114 deviates from the end of the second guide rail 116, a left plane of the lower first transfer plate 114 is in contact with the first trigger 117a of the first guide bar 117. In this case, in the lower first chain 113, the lower first transfer plate 114 hinge-coupled to the first transfer roller 133 is separated from the second guide rail 116 and simultaneously rotates in a left direction of the first transfer roller 133 as an axis to drop down the loaded coal pile. In addition, in FIG. 29c, the plane of the upper first transfer plate 114 moves upward along the first trigger 117a. In FIG. 29d, the lower first transfer plate 114 is maintained in the substantially vertical state and moves without pivoting along a rotation radius of the first drive sprocket 111 while the plane contacts the first guide bar 117. In FIG. 29e, while the lower first transfer plate 114 transferred upward moves upward of the first guide rail 115, the lower first transfer plate 114 becomes the upper first transfer plate 114, and as a result, the coal pile input from the coal constant feeder 400 with a predetermined amount along the upper first transfer plate 114 is loaded and transferred. In addition, the coal pile loaded on the upper first transfer plate 114 is transferred and dried by the reheat steam. The coal pile dropped from the lower first transfer plate 114 is discharged to an outlet 131 along a first slope 139.

Further, the coal pile dropped from the first coal dryer 110 to the outlet 131 is input to an inlet 160 of the second coal dryer 140, input on the surface of the second transfer plate 144 of the second coal dryer 140, and then transferred. In addition, the coal pile loaded on the upper second transfer plate 144 is transferred and dried by the reheat steam.

The transfer process of coal in the second coal dryer 140 is the same as the transfer process of the first coal dryer 110. In addition, the coal pile dropped from the lower second transfer plate 144 is discharged to an outlet 161 along a second slope 149. In addition, the coal pile dropped from the second coal dryer 140 to the outlet 161 is naturally dried while supplied and transferred to the third coal dryer 170.

In FIG. 26, the dust reducer 10 is installed on the bottom of the coal constant feeder 400. The dust reducer 10 is installed to be spaced apart from the upward surfaces of the plurality of first transfer plates 114 of the first coal dryer 110 by a predetermined gap. The inlet pipe 11 of the dust reducer 10 is coupled to the outlet 401 of the coal constant feeder 400 by the bearing. The worm wheel 14 is coupled on the outer periphery of the inlet pipe 11. The worm 15 is engaged in the gear formed on the outer periphery of the worm wheel 14. The worm 15 is gear-coupled with the worm wheel 14 and rotates at a predetermined velocity with the rotary force transferred from a motor 16. The worm wheel 14 is gear-coupled with the worm 15 at a predetermined gear ratio and the worm wheel 14 reduces the rotary velocity of the worm 15. The motor 16 which generates the rotary force in a predetermined direction may rotate forward or backward. The top of the curved pipe 17 is coupled to the inlet pipe 11. The curved pipe 17 has the shape in which the curved pipe 17 is bent in a predetermined direction. The pipe cross-section of the curved pipe 17 may have any one of the zigzag shape, the twist shape, and the spiral shape. The curved pipe 17 reduces the velocity at which the coal is supplied by changing the direction of the coal supplied by the coal constant feeder 400. Moreover, the curved pipe 17 may be bent or twisted at least twice or more. The outlet pipe 12 is coupled to the end of the curved pipe 17. The outlet pipe 12 decides a direction in which the coal is input onto the first transfer plate 114. Further, the inlet pipe 11 and the outlet pipe 12 may be installed on substantially the same central axis.

Moreover, the dust reducer 10 decreases the velocity at which the coal is dropped onto the upward surface of the first transfer plate 114 by rotating a predetermined amount of coal supplied by the coal constant feeder 400 to suppress the generation of the dust.

In the coal supply device for reducing the dust in the coal drying system of the present invention, which is configured as such, the coal pile C is vertically dropped through the outlet 401 of the coal constant feeder 400 by the gravity. In this case, while the coal pile C passes through the curved shape 17 of the dust reducer 10, the input velocity of the coal pile C is reduced. That is, the coal pile C input through the outlet 401 is supplied in a left direction while contacting a pipe which protrudes from the right side to the left side in the curved pipe 17 and supplied in a right direction while contacting a pipe which protrudes fro the left side to the right side in the curved pipe 17 again and thereafter, supplied onto the first transfer plate 114 through the outlet pipe 12. The coal pile C is supplied through the outlet pipe 12 after the velocity of the coal pile C is reduced while changing the direction several times according to the number of bending or twisting times of the curved pipe 17.

Further, in the dust reducer 10, the worm wheel 14 rotates by the rotary force of the worm 15 coupled to a rotary shaft of the motor 16, and as a result, the inlet pipe 11 on which the worm wheel 14 rotates. The rotation of the inlet pipe 11 rotates the curved pipe 17 and the outlet pipe 12. The supply of the coal pile C which is further reduced by an influence by the bent or twisted curved pipe 17 and the rotary force of the curved pipe 17 passing through the dust reducer 10 is provided, and as a result, the velocity of the coal pile C supplied onto the surface of the first transfer plate 114 is finally reduced to minimize the generation of the dust.

Figure 31:
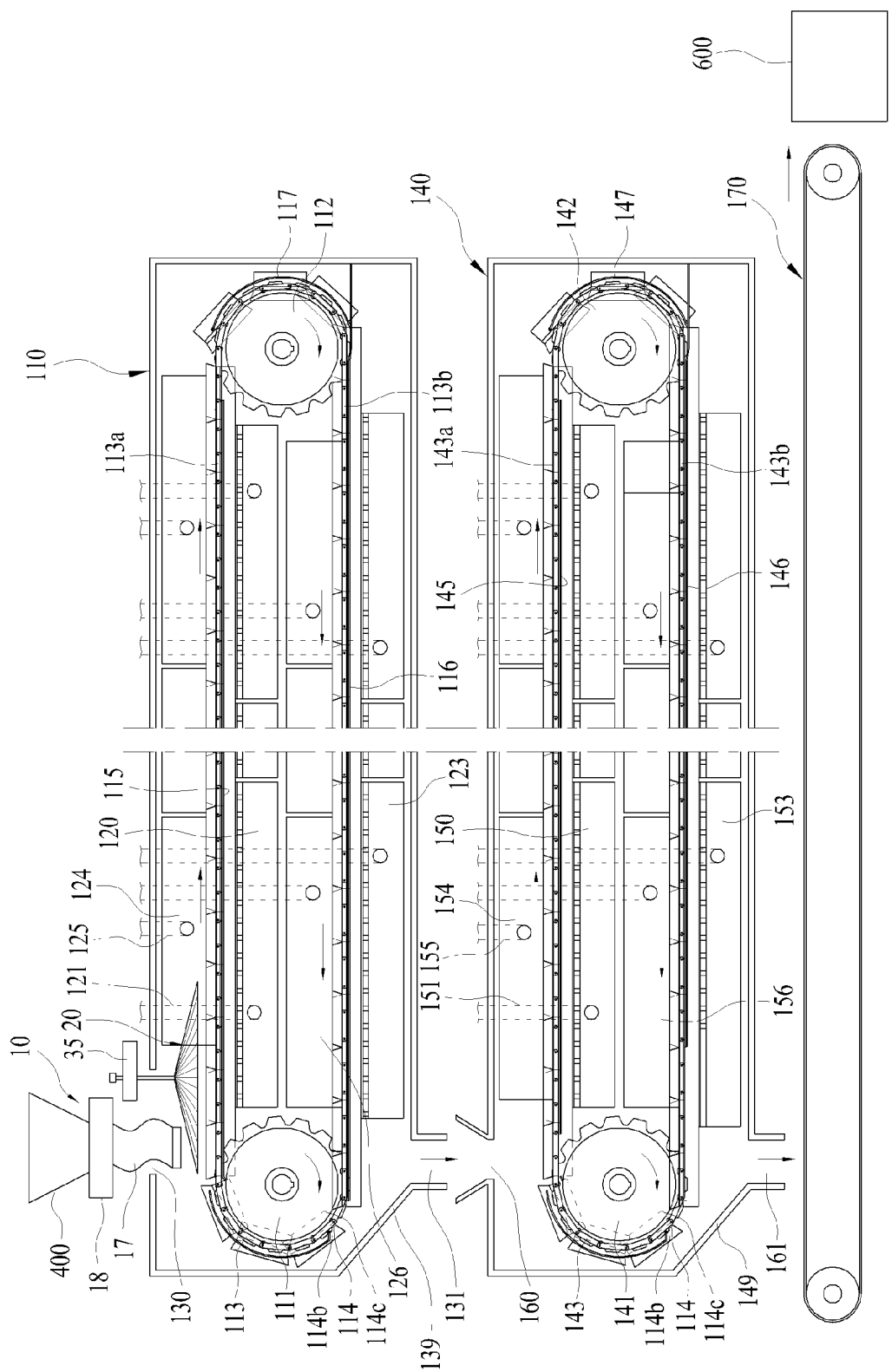
FIG. 31 is a configuration diagram illustrating a front side of the system for drying coal using reheat steam, as a fifth embodiment of the present invention.

Next, a fifth embodiment of the apparatus for dust reduction and dispersion supply of input coal in a system for drying coal using reheat steam according to the present invention will be described with reference to FIGS. 31 and 32. The fifth embodiment includes a configuration and a structure that drops and supplies the coal pile transferred on the transfer plate to the transfer plate of the lower dryer in the multi-stage dryer in addition to the configuration and the structure of the transfer plate.

Figure 32:
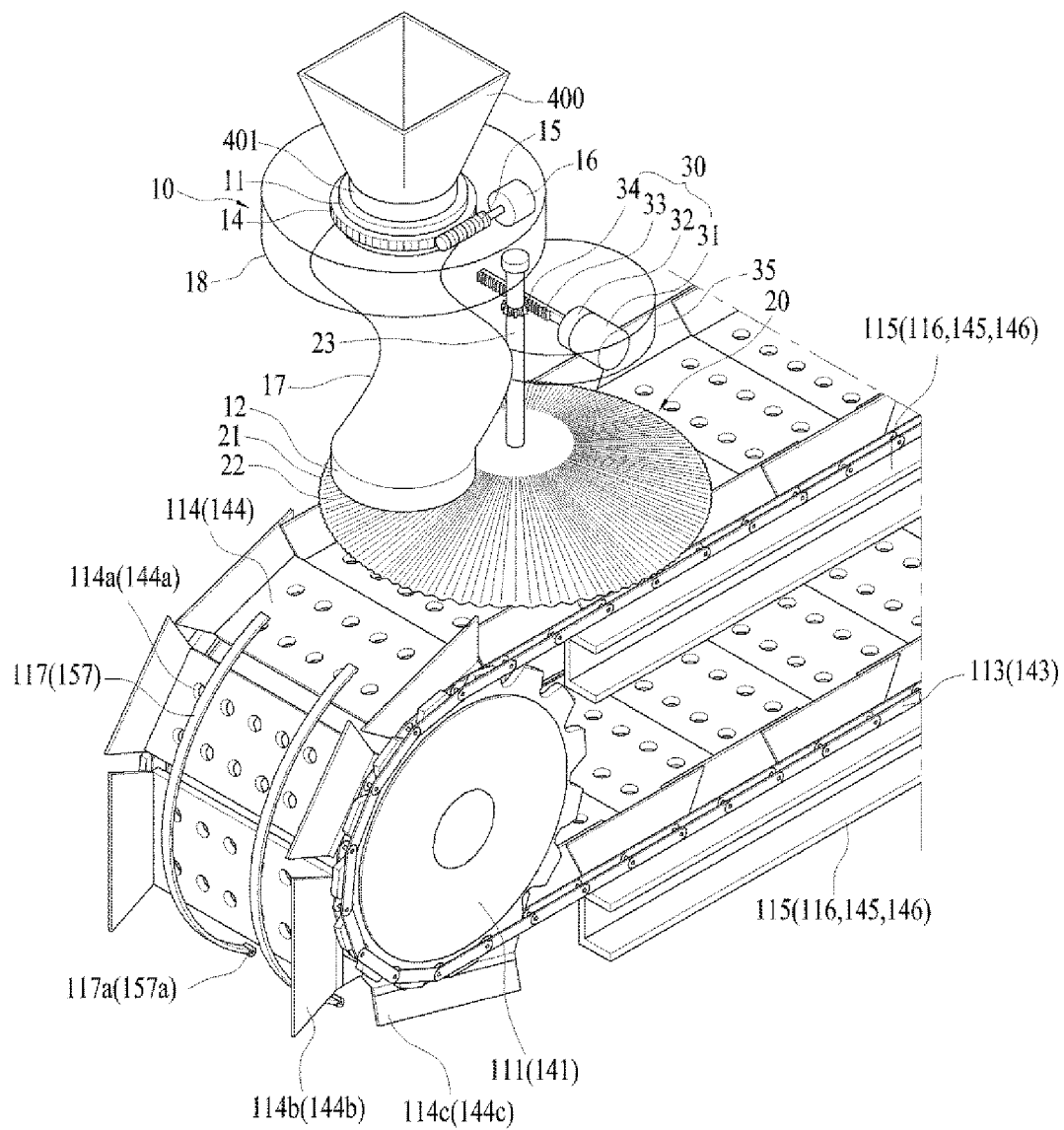
FIG. 32 is a perspective view illustrating a main part where the dust reducer and the dispersion feeder are installed in the system for drying coal using reheat steam according to the present invention.

First, FIG. 32 illustrates an example in which the dust reducer 10 of the fourth embodiment for reducing the dust of the coal and the dispersion feeder 60 are installed in the coal drying system 100.

Accordingly, the dust reducer 10 decreases the velocity at which the coal is dropped onto the upward surface of the first transfer plate 114 by rotating a predetermined amount of coal supplied by the coal constant feeder 400 to suppress the generation of the dust. The dispersion feeder 60 is installed on one side of the dust reducer 10 and below the dust reducer 10. In the dispersion feeder 60, a conical dispersion disk 61 is installed to be spaced apart from the outlet pipe 12 of the dust reducer 10 at a predetermined distance below the outlet pipe 12. A rotary shaft 63 is coupled to the top of the center of the dispersion disk 61. The concave-convex 62 may be formed on the surface of the dispersion disk 61 with the mountains and valleys formed radially around the rotary shaft 63 at a predetermined interval. The concave-convex 62 allows the coal dropped and input onto the surface of the dispersion disk 61 while the dispersion disk 61 rotates at a predetermined angle to be easily dispersed in a predetermined direction. The bottom of the dispersion feeder 20 may be installed to be close to the surface of the first transfer plate 114. In this case, when the coal pile C supplied to the first transfer plate 114 is supplied between the bottom of the dispersion feeder 60 and the top of the first transfer plate 114, the supply of the coal pile C may not be interfered by the dispersion feeder 60.

The power generator 30 generating predetermined motion power is provided in the dispersion feeder 60. The power generator 30 includes a forward/reverse motor 31 generating predetermined forward rotary power and reverse rotary power, a conversion gear box 32 decelerating the rotary power output from the forward/reverse motor and converting a rotary motion into a linear reciprocating motion, a rack gear 33 axially coupled to the conversion gear box, and a pinion gear 34 coupled to the rotary shaft 63 and engaged with the rack gear 33. Accordingly, the conversion gear box 32 converts periodic forward/backward rotation of the forward/backward motor 31 into the linear reciprocating motion and transfers the linear reciprocating motion to the rack 33 and the rack 33 rotates the engaged pinion gear 34 forward and backward to allow the dispersion disk 61 to rotate forward and backward at a predetermined angle with the forward/backward rotation of the rotary shaft 63.

Accordingly, in the apparatus for dust reduction and dispersion supply of input coal in the system for drying coal, the dust reducer 10 which rotates a predetermined velocity reduces the velocity of the coal pile C supplied from the coal constant feeder 400 and thereafter, the coal pile C is dispersed with a predetermined area by the dispersion feeders 20 and 60 and thus evenly input on the surface facing the top of the first transfer plate 114 to minimize the generation of the dust from the supplied coal and the coal is evenly and smoothly supplied to enhance drying efficiency, and as a result, during the process of drying the coal in the coal drying system, the coal is prevented from being scattered to prevent the environmental contamination caused by the dust, prevent loss or malfunction of the coal drying system, and reduce cost depending on maintenance of the coal drying system.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

According to the present invention, since discharge of contaminated or pollutant materials by dust are minimized by preventing the dust from being generated while supplying coal onto a transfer plate for transferring the coal feeding in a system for drying coal using reheat steam to resolve environmental problems, incomplete combustion of the coal can be prevented by removing moisture that remains at the inside and outside of the coal as used fuel of a thermal power plant is removed, a caloric value of the coal can enhanced and emission of the pollutant materials can minimized, and stability in supplying the coal can be enhanced by increasing utilization of low-grade coal with low demand, industrial applicability is high.

The invention claimed is:

1. An apparatus for dust reduction and dispersion supply of input coal in a system for drying coal using reheat steam including
a first coal dryer in which a pair of first drive sprockets and a pair of first driven sprockets are spaced apart from each other at a predetermined distance to be fastened to first chains, respectively, a plurality of transfer plates is hinge-coupled between the first chains, a pair of first guide rails horizontally supporting a first transfer plate is installed below an upper second chain connected between a first drive sprocket and a first driven sprocket, a pair of second guide rails horizontally supporting a first transfer plate is installed below a lower first chain connected between the first drive sprocket and the first driven sprocket, a first steam chamber injecting reheat steam supplied from a reheater is installed below an upper first chain, a second steam chamber injecting reheat steam supplied from the reheater is installed below the lower first chain, a first exhaust gas chamber collecting exhaust gas is installed on the upper first chain, and a second exhaust gas chamber collecting exhaust gas is installed on the lower first chain, and a second coal dryer in which a pair of second drive sprockets and a pair of second driven sprockets are spaced apart from each other at a predetermined distance to be fastened to second chains, respectively, a plurality of transfer plates is hinge-coupled between the second chains, a pair of second guide rails horizontally supporting a second transfer plate is installed below an upper second chain connected between a second drive sprocket and a second driven sprocket, a pair of second guide rails horizontally supporting the second transfer plate is installed below a lower second chain connected between the second drive sprocket and the second driven sprocket, a third steam chamber injecting reheat steam supplied from the reheater is installed below the upper second chain, a fourth steam chamber injecting reheat steam supplied from the reheater is installed below the lower second chain, a third exhaust gas chamber collecting exhaust gas is installed on the upper second chain, and a fourth exhaust gas chamber collecting exhaust gas is installed on the lower second chain, wherein coal which is primarily dried in the first coal dryer is inputted into the second coal dryer and thus is secondarily dried, the apparatus comprising:

a coal constant feeder supplying a predetermined amount of coal onto an upward surface of the first transfer plate; and a dust reducer constituted by an inlet pipe coupled to an outlet of the coal constant feeder by a bearing, a worm wheel coupled onto the outer periphery of the inlet pipe, a worm gear-coupled with the worm wheel and rotating with rotary force transferred from a motor, a curved pipe of which a top is coupled to the inlet pipe, and an outlet pipe coupled to the end of the curved pipe, wherein the dust reducer which rotates at a predetermined velocity reduces velocity of the coal supplied by the coal constant feeder to minimize generation of dust from the coal input onto the upward surface of the first transfer plate.

2. The apparatus for dust reduction and dispersion supply of input coal in a system for drying coal using reheat steam of claim 1, the apparatus further comprising:

a dispersion feeder fixedly installed below the dust reducer with a fixation member, having an inclination angle having a predetermined angle from the top to bottom, and having a shape in which the dispersion feeder is widened from the top to the bottom, wherein the dust reducer which rotates at the predetermined velocity reduces the velocity of the coal supplied by the coal constant feeder and thereafter, supplies the coal to the dispersion feeder and the dispersion feeder evenly distributes and supplies the coal onto an upward surface of the first plate.

3. The apparatus for dust reduction and dispersion supply of input coal in a system for drying coal using reheat steam of claim 2, wherein a plurality of protrusions or embossings are formed to protrude on the surface of the dispersion feeder at a predetermined interval.

4. The apparatus for dust reduction and dispersion supply of input coal in a system for drying coal using reheat steam of claim 2, wherein a concave-convex having mountains and valleys formed at a predetermined interval is formed on a surface of the dispersion feeder.

5. The apparatus for dust reduction and dispersion supply of input coal in a system for drying coal using reheat steam of claim 2, wherein the dispersion feeder is installed in a direction in which the first transfer plate is transferred or an opposite direction thereto.

6. The apparatus for dust reduction and dispersion supply of input coal in a system for drying coal using reheat steam of claim 1, further comprising:

a dispersion feeder including a power generator installed on one side of the dust reducer and below the dust reducer, and a conical dispersion disk axially coupled with a rotational shaft coupled to a top of a center and a power shaft of the power generator and receiving power generated by the power generator through the rotational shaft to rotate forward/backward at a predetermined angle, wherein the dust reducer which rotates at the predetermined velocity reduces the velocity of the coal supplied by the coal constant feeder and thereafter, supplies the coal to the dispersion feeder and the dispersion feeder evenly distributes and supplies the coal onto the upward surface of the first plate by the dispersion disk which rotates forward/backward at the predetermined angle.

7. The apparatus for dust reduction and dispersion supply of input coal in a system for drying coal using reheat steam of claim 6, wherein the power generator includes a forward/backward motor generating predetermined forward rotary power and reverse rotary power, a conversion gear box decelerating the rotary power output from the forward/reverse motor and converting a rotary motion into a linear reciprocating motion, a rack gear axially coupled to the conversion gear box, and a pinion gear coupled to the rotary shaft and engaged with the rack gear.

8. The apparatus for dust redaction and dispersion supply of input coal in a system for drying coal using reheat steam of claim 6, wherein the power generator includes a forward/backward motor generating predetermined forward rotary power and backward rotary power, a worm axially coupled to the forward/backward motor, and a worm wheel coupled to the rotary shaft and engaged with the worm gear.

9. The apparatus for dust reduction and dispersion supply of input coal in a system for drying coal using reheat steam of claim 6, wherein the power generator includes an actuator generating linear reciprocating motion, a worm axially coupled to the actuator, and a worm wheel coupled to the rotary shaft and engaged with the worm gear.

10. The apparatus for dust reduction and dispersion supply of input coal in a system for drying coal using reheat steam of claim 6, wherein concave-convex having the mountains and valleys formed at a predetermined interval radially around the rotational shaft is formed on the surface of the dispersion disk.

11. The apparatus for dust reduction and dispersion supply of input coal in a system for drying coal using reheat steam of claim 6, wherein a cover for preventing coal dust from being scattered is installed on an outer part including the dispersion feeder.

12. The apparatus for dust reduction and dispersion supply of input coal in a system for drying coal using reheat steam of claim 1, wherein as the curved pipe, any one having pipe cross-sections of a zigzag shape, a twist shape, and a spiral shape is adopted.

13. The apparatus for dust reduction and dispersion supply of input coal in a system for drying coal using reheat steam of claim 1, wherein the inlet pipe and the outlet pipe are installed on a same central axis.

14. The apparatus for dust reduction and dispersion supply of input coal in a system for drying coal using reheat steam of claim 1, wherein as the motor, a forward/backward motor which rotates forward or backward is adopted.

15. The apparatus for dust reduction and dispersion supply of input coal in a system for drying coal using reheat steam of claim 1, wherein an entirety of the dust reducer other than the worm wheel, the worm gear, and the outlet pipe is installed in a case.

16. The apparatus for dust reduction and dispersion supply of input coal in a system for drying coal using reheat steam of claim 1, wherein a first transfer roller is hinge-coupled between two-side centers of the first transfer plate and the first chains, respectively, at left and right sides of the first transfer roller, first auxiliary rollers are hinge-coupled with sides of the first transfer plate, respectively, the first transfer rollers are hinge-coupled between both centers of the second transfer plate and the second chains, respectively, at left and right sides of the second transfer roller, second auxiliary rollers are hinge-coupled with the sides of the second transfer plate, respectively, a first guide bar rotating and up-supporting the lower first transfer plate separated from the second guide rail in one direction is installed from the top to a bottom of the first drive sprocket along the side, a second guide bar rotating and down-supporting the upper first transfer plate separated from the first guide rail is installed from the bottom to the top of the first driven sprocket along the side, a third guide bar rotating and up-supporting the lower second transfer plate separated from a fourth guide rail in one direction is installed from the top to the bottom of the second drive sprocket along the side, and a fourth guide bar rotating and down-supporting the upper second transfer plate separated from the third guide rail is installed from the bottom to the top of the second driven sprocket along the side.

* * * * *